US012036517B2

(12) United States Patent
Choi et al.

(10) Patent No.: US 12,036,517 B2
(45) Date of Patent: Jul. 16, 2024

(54) CHA ZEOLITE MEMBRANE AND METHOD OF PREPARING THE SAME

(71) Applicant: KOREA UNIVERSITY RESEARCH AND BUSINESS FOUNDATION, Seoul (KR)

(72) Inventors: Jungkyu Choi, Seoul (KR); Kwan Young Lee, Seoul (KR); Sung-Won Hong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/897,798

(22) Filed: Aug. 29, 2022

(65) Prior Publication Data

US 2023/0001360 A1     Jan. 5, 2023

Related U.S. Application Data

(62) Division of application No. 16/729,587, filed on Dec. 30, 2019, now Pat. No. 11,458,441.

(30) Foreign Application Priority Data

Dec. 28, 2018  (KR) .................. 10-2018-0172311

(51) Int. Cl.
*B01D 53/22*   (2006.01)
*B01D 69/10*   (2006.01)
*B01D 71/02*   (2006.01)

(52) U.S. Cl.
CPC ....... *B01D 71/0281* (2022.08); *B01D 69/108* (2022.08); *B01D 2257/504* (2013.01);
(Continued)

(58) Field of Classification Search
CPC ........ B01D 2258/0283; B01D 2323/24; B01D 2257/504; B01D 71/028; B01D 2325/02;
(Continued)

(56) References Cited

U.S. PATENT DOCUMENTS 4,623,637 A * 11/1986 van der Smissen ... A62B 19/02
                                                              423/247
4,860,584 A     8/1989 Mercer et al.
(Continued)

FOREIGN PATENT DOCUMENTS

JP     2009-24272 A     2/2009
JP     2011-16123 A     1/2011
(Continued)

OTHER PUBLICATIONS

Machine Translation JP 2017-080744 A Yamada May 18, 2017 (Year: 2017).*
(Continued)

*Primary Examiner* — Anthony R Shumate
(74) *Attorney, Agent, or Firm* — NSIP Law

(57) ABSTRACT

Disclosed are a CHA zeolite membrane and a method of preparing the same, and more particularly, a CHA zeolite membrane having high capacity to separate $CO_2/N_2$ and $CO_2/CH_4$ even under wet conditions using a membrane produced using a synthetic precursor having a controlled ratio of Si and Al, a method of preparing the same, and a method of capturing and removing carbon dioxide using the membrane.

12 Claims, 13 Drawing Sheets
(12 of 13 Drawing Sheet(s) Filed in Color)

(52) U.S. Cl.
CPC ............... *B01D 2258/0283* (2013.01); *B01D 2311/2626* (2013.01); *B01D 2323/08* (2013.01); *B01D 2323/12* (2013.01); *B01D 2323/24* (2013.01); *B01D 2325/02* (2013.01)

(58) Field of Classification Search
CPC .................... B01D 69/10; B01D 2323/08; B01D 2323/12; B01D 2311/2626
See application file for complete search history.

(56) References Cited

U.S. PATENT DOCUMENTS

| | | | |
|---|---|---|---|
| 4,927,768 A | 5/1990 | Coughlin et al. | |
| 5,008,090 A * | 4/1991 | Joy, III | B01D 53/945 423/213.2 |
| 6,066,587 A * | 5/2000 | Kurokawa | F01N 3/2803 502/328 |
| 10,384,167 B2 | 8/2019 | Helm et al. | |
| 2003/0220188 A1* | 11/2003 | Marand | B01D 53/228 502/60 |
| 2005/0129597 A1* | 6/2005 | Cross | B01J 20/12 502/353 |
| 2007/0144970 A1* | 6/2007 | Barrere Tricca | B01D 53/228 502/4 |
| 2008/0190999 A1* | 8/2008 | Tomasini | B65D 81/28 229/87.08 |
| 2008/0216650 A1* | 9/2008 | Falconer | B01D 53/228 428/319.1 |
| 2009/0266237 A1 | 10/2009 | Serra Alfaro et al. | |
| 2010/0257843 A1* | 10/2010 | Hoke | B01J 23/63 502/328 |
| 2011/0274607 A1* | 11/2011 | Reddy | B01J 29/7815 502/77 |
| 2012/0024777 A1 | 2/2012 | Sugita et al. | |
| 2012/0148828 A1 | 6/2012 | Tsapatsis et al. | |
| 2014/0076161 A1* | 3/2014 | Li | B01D 71/0281 96/11 |
| 2014/0331860 A1* | 11/2014 | Isomura | B01D 71/028 95/52 |
| 2014/0360939 A1 | 12/2014 | Yamada et al. | |
| 2017/0189862 A1* | 7/2017 | Imasaka | B01J 20/3238 |
| 2017/0296980 A1* | 10/2017 | Noda | B01D 69/02 |
| 2017/0296983 A1* | 10/2017 | Noda | B01D 71/022 |
| 2018/0043656 A1 | 2/2018 | Song et al. | |
| 2018/0065105 A1 | 3/2018 | Song et al. | |
| 2018/0326365 A1* | 11/2018 | Choi | B01D 69/02 |
| 2019/0143296 A1* | 5/2019 | Choi | B01J 20/28033 95/51 |
| 2019/0224630 A1* | 7/2019 | Imasaka | B01D 53/228 |
| 2019/0275474 A1* | 9/2019 | Imasaka | C01B 39/085 |
| 2019/0321785 A1* | 10/2019 | Choi | B01D 71/028 |
| 2019/0336950 A1* | 11/2019 | Zheng | B01J 23/8946 |
| 2020/0114307 A1 | 4/2020 | Tanaka et al. | |
| 2020/0206697 A1* | 7/2020 | Choi | B01D 53/228 |
| 2020/0298187 A1* | 9/2020 | Choi | B01D 71/028 |
| 2021/0001285 A1* | 1/2021 | Choi | B01D 71/0281 |
| 2022/0203307 A1* | 6/2022 | Nair | B01D 67/0088 |
| 2022/0263099 A1* | 8/2022 | Kim | H01M 8/1018 |

FOREIGN PATENT DOCUMENTS

| | | |
|---|---|---|
| JP | 2012-045483 A | 3/2012 |
| JP | 5783527 B2 | 9/2015 |
| JP | 2016-169118 A | 9/2016 |
| JP | 2017-080744 A | 5/2017 |
| KR | 10-2016-0062446 A | 6/2016 |
| WO | WO 2016/006564 A1 | 1/2016 |

OTHER PUBLICATIONS

Zang et al. "Electronic structure of chabazite zeolites H-SSZ-13 and H-SAPO-34" Microporous and Mesoporous Materials 338 (2022) 111957, pp. 1-7 (Year: 2022).*

Díaz-Cabañas, Maria-Jose et al., "Synthesis and structure of pure SiO 2 chabazite: the SIO 2 polymorph with the lowest framework density." *Chemical Communications*, vol. 17, 1998 (pp. 1881-1882).

Lai, Zhiping et al., "Microstructural Optimization of a Zeolite Membrane for Organic Vapor Separation", *Science*, vol. 300, Issue 5618, Apr. 18, 2003 (pp. 456-460).

Choi, Jungkyu, et al. "MFI zeolite membranes from a-and randomly oriented monolayers." *Adsorption*, vol. 12, Issue 5-6, 2006 (pp. 339-360).

Choi, Jungkyu, et al. "Uniformly a-oriented MFI zeolite films by secondary growth." *Angewandte Chemie International Edition*, vol. 45, Issue 7, 2006 (pp. 1154-1158).

Korea Notice of Allowance issued on Jan. 7, 2021 in counterpart Korean Patent Application No. 10-2018-0172311 (2 pages in English and 2 pages in Korean).

Krishna, R., et al., "Segregation effects in adsorption of CO2-containing mixtures and their consequences for separation selectivities in cage-type zeolites." *Separation and Purification Technology*, vol. 61, Issue 3, 2008 (pp. 414-423).

Avila, Adolfo M., et al. "Concentration polarization in SAPO-34 membranes at high pressures." *Journal of Membrane Science*, vol. 335, Issue 1-2, 2009 (pp. 32-36).

Li, Shiguang et al., "High-flux SAPO-34 membrane for CO2/N2 separation." *Industrial & Engineering Chemistry Research*, vol. 49, Issue 9, 2010 (pp. 4399-4404).

Cao Thanh Pham, Tung et al., "Growth of Uniformly Oriented Silica MFI and BEA Zeolite Films on Substrates", *Science*, vol. 334, Issue 6062, Dec. 16, 2011 (pp. 1533-1538).

Kim, Eunjoo, et al., "Uniform Si-CHA Zeolite Layers Formed by a Selective Sonication-Assisted Deposition Method." *Angewandte Chemie International Edition*, vol. 52, Issue 20, 2013 (pp. 5280-5284).

Kim, Eunjoo, et al., "Chemical vapor deposition on chabazite (CHA) zeolite membranes for effective post-combustion CO2 capture." *Environmental science & technology*, vol. 48, Issue 24, 2014 (pp. 14828-14836).

Kim, Eunjoo, et al., "On the synthesis and characterization of all-silica CHA zeolite particles." *Microporous and Mesoporous Materials*, vol. 184, 2014 (pp. 47-54).

Kosinov, Nikolay, et al., "High flux high-silica SSZ-13 membrane for CO 2 separation." *Journal of Materials Chemistry A*, vol. 2, Issue 32, 2014 (pp. 13083-13092).

Jeon, Mi Young, et al., "Ultra-selective high-flux membranes from directly synthesized zeolite nanosheets." *Nature*, vol. 543, Issue 7647, 2017 (17 pages in English).

Hong, Sungwon, et al. "Healing of microdefects in SSZ-13 membranes via filling with dye molecules and its effect on dry and wet CO2 separations." *Chemistry of Materials* vol. 30, Issue 10, 2018 (pp. 3346-3358).

Korean Office Action issued on Feb. 13, 2020 in corresponding Korean Patent Application No. 10-2018-0172311 (8 pages in Korean).

* cited by examiner (a1) CHA_20

(b1) CHA_100

(c1) CHA_∞

CHA ZEOLITE MEMBRANE AND METHOD OF PREPARING THE SAME

CROSS-REFERENCE TO RELATED APPLICATIONS

This application is divisional of U.S. patent application Ser. No. 16/729,587 filed on Dec. 30, 2019, which claims the benefit under 35 USC 119(a) of Korean Patent Application No. 10-2018-0172311, filed on Dec. 28, 2018, in the Korean Intellectual Property Office, the entire disclosures of which are incorporated herein by reference for all purposes.

TECHNICAL FIELD

The present invention relates to a CHA zeolite membrane and a method of preparing the same, and more particularly to a CHA zeolite membrane having high capacity to separate $CO_2/N_2$ and $CO_2/CH_4$ even under wet conditions using a membrane produced using a synthetic precursor having a controlled ratio of Si and Al, a method of preparing the same, and a method of capturing and removing carbon dioxide using the membrane.

BACKGROUND ART

Zeolites are aluminosilicate crystalline materials that have regular and rigid microporous structures. Because the size of the pore structures is close to those of permanent gases, a zeolite, if appropriately selected, can act as a molecular sieve, functioning analogously to a conventional sand/stone/gravel sieve used on construction sites. Indeed, zeolite membranes have high potential for use in distinguishing minute differences between the shape and size of permanent gases, thus achieving energy-efficient gas separation (Jeon, M. Y. et al., Nature 2017, 543, 690-691; Tung, C. T. P. et al., Science 2011, 334, 1533-1538).

Separation of mixed material using a zeolite membrane is based on the difference in permeation rates of the constituents of the mixed material permeating the membrane. In the zeolite membrane, permeation is achieved by adsorption, diffusion and desorption. The intrinsic pore structure and surface properties of the zeolite have an influence on this process. In this respect, CHA zeolites with a pore size of $0.37 \times 0.42$ nm$^2$ have a structure suitable for separating $CO_2$ having a size of 0.33 nm from $N_2$ (0.364 nm) and $CH_4$ (0.38 nm).

If a zeolite is chosen such that its pore size lies between the size of $CO_2$ and other larger molecules, the molecular sieve can act as a good $CO_2$ separator. In this respect, eight-membered-ring (8 MR) zeolites, whose maximum pore size is 0.43 nm, are promising molecular sieves for the separation of $CO_2$ (0.33 nm) from other larger gas molecules such as $N_2$ (0.364 nm) and $CH_4$ (0.38 nm) (Breck, D. W., John Wiley & Sons, Inc.: 1974). Effective $CO_2/N_2$ and $CO_2/CH_4$ separation is attractive to many researchers because of the importance of regulating flue gas emissions in fossil fuel combustion and in the upgrading of natural gas and biogas. Research is underway to realize high $CO_2/N_2$ and $CO_2/CH_4$ separation performance of CHA zeolite membranes (Avila et al., Journal of Membrane Science, 2009, 335, 32-36; Li et al., Industrial and Engineering Chemistry Research, 2010, 49, 4399-4404).

Conventional zeolite membranes are generally measured under conditions that do not contain moisture in the feed gas. The reason for this is that the moisture contained in the feed gas affects the performance of the membrane and thus prevents smooth gas separation through the membrane. In actual gas separation processes, however, the membrane is often exposed to wet conditions. Examples thereof include flue gas treatment and biogas upgrading. Flue gas generated after combustion of fossil fuel undergoes a desulfurization process. In this process, a large amount of water is injected into flue gas to finally have a composition of $CO_2$, $N_2$ and $H_2O$. Since biogas is produced from living organisms, it inevitably contains a large amount of water and has a composition of $CO_2$, $CH_4$ and $H_2O$. Therefore, in order to use conventional zeolite membranes for the actual flue gas treatment and biogas upgrading processes, it is necessary to completely remove the water contained in the feed gas through a dehydration process. This dehydration process is a major factor that increases the cost of the process and thus limits the application of the membrane process to the actual process.

In flue gas treatment or biogas upgrading processes that require selective separation of $CO_2$, moisture is always present, in addition to $CO_2$ and $N_2$, or $CO_2$ and $CH_4$. Moisture present in the mixed gas serves to hinder the selective adsorption and diffusion of $CO_2$ in the zeolite membrane, resulting in a reduction in $CO_2$ permeance. In order to prevent the decreased $CO_2$ permeance due to moisture, a method of synthesizing zeolite such that the surface of zeolite is hydrophobic has been proposed (Kosinov et al., Journal of Materials Chemistry A, 2014, 2, 13083-13092). Zeolite has a structure in which Si and Al are connected through four crosslinked oxygen atoms. In this regard, when the ratio of Al in the structure is lowered, the surface becomes hydrophobic. The hydrophobic surface has been reported to be less susceptible to moisture and thus result in higher permeance.

When the zeolite membrane is fabricated, defects having a size larger than zeolite pores are also formed. These defects provide non-selective passages, thus reducing the selectivity of the membranes. However, it is known that in the presence of moisture, moisture may be adsorbed on the defects and thus contribute to the improvement of separation performance (Hong et al., Chemistry of Materials, 2018, 30, 3346-3358). For this reason, in order to obtain a membrane having optimum separation performance under wet conditions, the defect structures of membranes as well as the surface properties associated with water adsorption should be considered.

Since Si and Al serve as central atoms for forming zeolite structures, the formation of the zeolite structures is greatly affected by the ratio of the two atoms. Thus, the CHA zeolite membranes exhibit various results depending on the Si/Al ratio, thus causing the formation of various defect structures.

PCT Patent Publication No. WO 2016/006564 A1 discloses a method of preparing a membrane while changing Si/Al. However, the document relates to a membrane for gas separation under dry conditions, wherein the membrane has a problem in which the membrane is not optimized under the condition of a feed gas containing moisture, which is an actual process condition.

Thus, there is a need for a technology for producing a membrane that can exhibit high performance under such actual process conditions containing moisture and can improve economic efficiency.

Therefore, as a result of extensive efforts to solve these problems, the present inventors found that, in the preparation of a CHA zeolite membrane, when preparing a membrane using a synthetic precursor having a controlled ratio of Si and Al, unlike conventional zeolite membranes, the hydrophobicity and defect formation of the zeolite membranes are optimized, and thus excellent $CO_2/N_2$ and $CO_2/CH_4$ separation performance can be obtained even under wet conditions. Based on this finding, the present invention has been completed.

DISCLOSURE OF INVENTION

Therefore, the present invention has been made in view of the above problems, and it is an object of the present invention to provide a membrane having higher $CO_2/N_2$ and $CO_2/CH_4$ separation performance than conventional zeolite membranes in both dry and wet conditions and a method of preparing the same.

It is another object of the present invention to provide a method of separating $CO_2$ using the membrane.

In accordance with an aspect of the present invention, the above and other objects can be accomplished by the provision of a method of preparing a CHA zeolite membrane including adding a support including a CHA particle seed layer deposited thereon to a synthetic solution for growing zeolite containing an organic structure-directing agent and Si and Al sources, and performing hydrothermal synthesis, wherein a molar ratio of Si/Al in the synthetic solution for growing zeolite is 5 or more.

In accordance with another aspect of the present invention, there is provided a method of preparing a CHA zeolite membrane including adding a support including a CHA particle seed layer deposited thereon to a synthetic solution for growing zeolite containing an organic structure-directing agent, and a Si source, without containing an Al source, and performing hydrothermal synthesis.

In accordance with another aspect of the present invention, there is provided a CHA zeolite membrane produced by the method, wherein the CHA zeolite membrane has a porosity of a defect of 0.1 to 1% and a z-axis tortuosity (tortuosity in a thickness direction) of the defect of 1 to 2.

In accordance with another aspect of the present invention, there is provided a method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite membrane.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

BEST MODE FOR CARRYING OUT THE INVENTION

Figure 1:
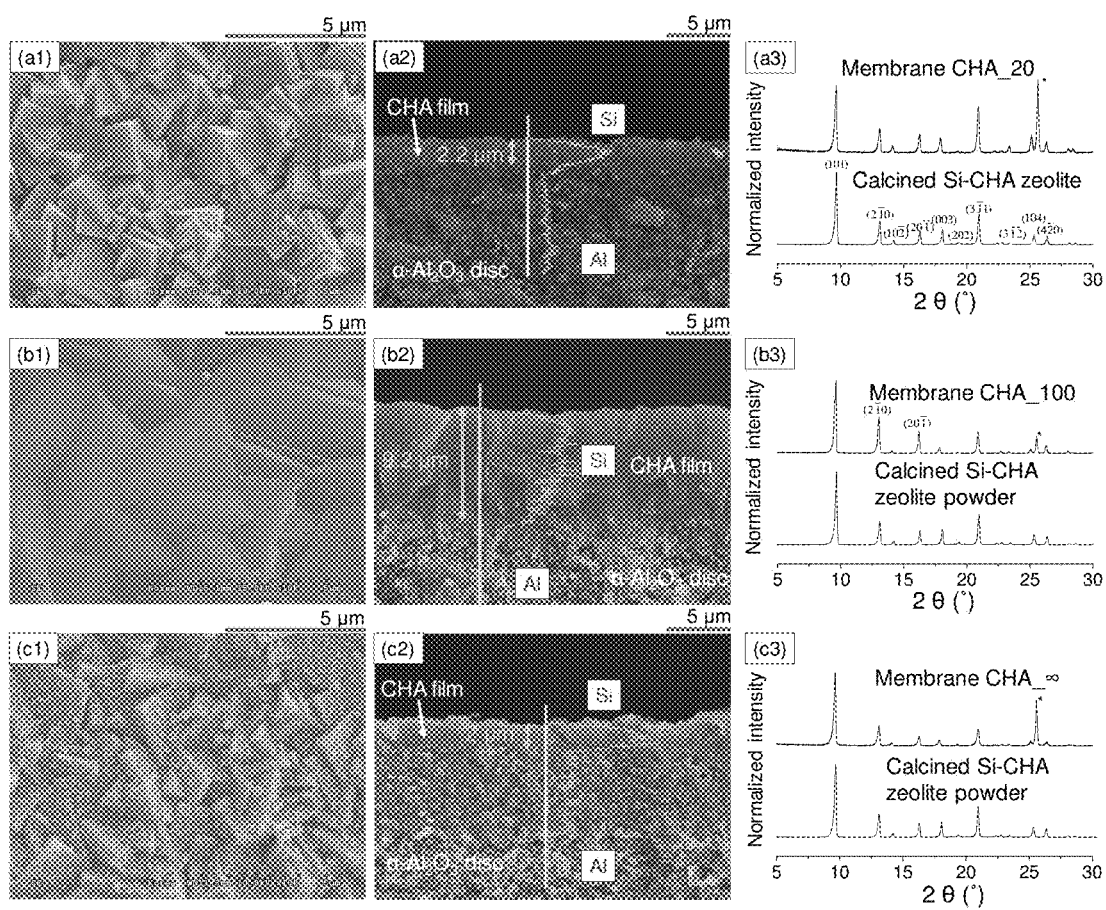
FIG. 1 is a SEM image showing a membrane according to one embodiment of the present invention.

Unless defined otherwise, all technical and scientific terms used herein have the same meanings as appreciated by those skilled in the field to which the present invention pertains. In general, the nomenclature used herein is well-known in the art and is ordinarily used.

In the production of a CHA zeolite membrane, it was found that, when a membrane is fabricated using a synthetic precursor having a controlled ratio of Si and Al, the zeolite membrane has optimized hydrophobicity and defect formation and thus high separation performance of $CO_2/N_2$ and $CO_2/CH_4$ even under wet conditions, unlike conventional zeolite membranes.

Therefore, in one aspect, the present invention provides a method of preparing a CHA zeolite membrane including adding a support including a CHA particle seed layer deposited thereon to a synthetic solution for growing zeolite containing an organic structure-directing agent, and Si and Al sources, and performing hydrothermal synthesis, wherein a molar ratio of Si/Al in the synthetic solution for growing zeolite is 5 or more.

Therefore, in another aspect, the present invention provides a method of preparing a CHA zeolite membrane including adding a support including a CHA particle seed layer deposited thereon to a synthetic solution for growing zeolite containing an organic structure-directing agent, and a Si source, without containing an Al source, and performing hydrothermal synthesis.

In the present invention, the molar ratio of Si/Al may be 5 or more, preferably 5 to 1,000, more preferably 10 to 1000, 20 to 1,000, 10 to 500, and most preferably 20 to 200.

In the present invention, the properties of zeolite are changed depending on the Si/Al ratio of the synthetic solution. Thus, similarly, zeolites having a CHA structure are affected by the Si/Al ratio of the synthetic solution. CHA particles with a low Si/Al ratio are hydrophilic and have many defects, whereas CHA particles with a high Si/Al ratio are hydrophobic and have fewer defects. In the present invention, the hydrophobicity and defect formation of the membrane can be optimized by controlling the Si/Al ratio when synthesizing the CHA zeolite membrane based on this principle. This results in the production of a CHA zeolite membrane having optimal Si/Al content providing excellent $CO_2$ separation performance under wet conditions.

Since the Si/Al ratio of the membrane affects not only the hydrophobicity of the membrane but also the formation of the defect structure, it is important to find a Si/Al ratio optimal for $CO_2$ separation in a wet condition. In the present invention, CHA zeolite membranes with various Si/Al ratios are produced, and the $CO_2/N_2$ and $CO_2/CH_4$ separation performance of each membrane under wet conditions are identified. As a result, the conditions for the synthesis of CHA zeolite membranes that exhibit the best performance under wet conditions were found.

As the temperature increases, adsorption of water on the membrane decreases. For this reason, the high-temperature wet condition is relatively less affected by water than the low-temperature wet condition. Therefore, a CHA zeolite membrane having optimum temperature-dependent performance is present. This is determined by the Si/Al ratio, which is directly related to the hydrophobicity and defect formation of the membrane. For this reason, it is important to find the optimum Si/Al ratio depending on the temperature. In the present invention, a membrane having an optimized Si/Al ratio depending on the process temperature was produced, so that a CHA zeolite membrane specialized for the temperature of each process may be applied.

In the present invention, the support may include at least one selected from the group consisting of alumina, polypropylene, polyethylene, polytetrafluoroethylene, polysulfone, polyimide, silica, glass gamma-alumina, mullite, zirconia, titania, yttria, ceria, vanadia, silicon, stainless steel and carbon.

In the present invention, the organic structure-directing agent may include one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine and cyclohexylamine.

In the present invention, the synthetic solution for growing zeolite growth may have a molar ratio of TMAdaOH:$SiO_2$:$H_2O$:NaOH:Al(OH)$_3$ of 1 to 100:100:1000 to 20000:1 to 100:0 to 20.

In the present invention, hydrothermal synthesis may be carried out at a temperature of 100 to 200° C. for 12 to 240 hours.

Typical CHA zeolites are promising for separating $CO_2$ from large molecules such as $N_2$ (associated with carbon capture after combustion) and $CH_4$ (associated with natural gas/biogas upgrading). In particular, the pore size of CHA zeolites (0.37×0.42 nm$^2$) can distinguish size differences between small molecules such as $CO_2$ (0.33 nm) and larger $N_2$ (0.364 nm) or $CH_4$ (0.38 nm) molecules, and thus can separate $CO_2$ through CHA membranes. In addition, the siliceous component of the CHA zeolite can reduce the adsorption capacity of smaller $H_2O$ molecules (0.265 nm), thus reducing the $H_2O$ permeation rate. This is highly preferable in ensuring excellent capacity of molecular sieves with selective $CO_2$ permeance in the presence of water vapor. In fact, siliceous CHA films with a nominal Si/Al ratio of 100 (CHA_100) exhibited high $CO_2/N_2$ and $CO_2/CH_4$ separation performance, especially in the presence of water vapor ($CO_2/N_2$ separation factor (SF) of ~13.4 and $CO_2/CH_4$ separation factor (SF) of ~37 at 30° C.). These SFs were higher than the corresponding values ($CO_2/CH_4$ SFs of ~5.2 and $CO_2/CH_4$ SFs of ~31) under dry conditions. Such improvement could be ascribed to defect blocking by physisorbed water molecules. Preferably, under wet conditions, the siliceous, hydrophobic CHA membrane (CHA_100) could provide the high $CO_2$ permeance of ~1.1–1.4×10$^{-7}$ mol·m$^{-2}$·s$^{-1}$·Pa$^{-1}$, which was as high as ~14 to 19% of that through bare supports. Finally, the contribution of molecular transport through zeolitic and non-zeolitic parts was quantitatively analyzed by combining information extracted from image processing of fluorescence confocal optical microscopy images with a 1-dimensional permeation model. The result showed that ~19% and ~20% of the total $CO_2$ permeance for CHA_100 were reduced due to transport inhibition by the physisorbed water molecules on the membrane surface and defects, respectively.

In the present invention, a secondary growth method was adopted for the fabrication of siliceous CHA membranes. First, a uniform CHA seed layer, which was mainly composed of plate-like CHA particles, was formed on a porous α-Al$_2$O$_3$ disc via a selective deposition method (Kim, E. et al., *Angew. Chem., Int. Ed.* 2013, 52, 5280-5284). The seed layer was further hydrothermally inter-grown to form a continuous, siliceous CHA membrane. For secondary growth, three different nominal Si/Al ratios of 20, 100, and infinity in the synthetic precursor were used. This approach was used to study the effect of the Si/Al ratio on the membrane properties systematically and, thus, the separation performances. Among the three, the most siliceous and thus most hydrophobic CHA membrane showed much improved separation performance for both $CO_2/N_2$ and $CO_2/CH_4$ mixtures under wet conditions compared to that under dry conditions. In addition, fluorescence confocal optical microscopy (FCOM) revealed that the CHA membranes showed distinctive features in the defect (crack) structure depending on the Si/Al ratios in the synthetic precursors. Image processing of the FCOM images provides correlation between the defect structure and the separation performance quantitatively. Furthermore, this relationship was used to elucidate the effect of the hydrophobicity and defect structure of the CHA membrane on the $CO_2$ permselectivities in wet feeds. Finally, the $CO_2$ permselectivity of the CHA membranes in the presence of $H_2O$ vapor in the feed was compared with those of CHA and other types of zeolite membranes in the literature, and CHA membranes have excellent performance under both dry and wet conditions were found.

In the present invention, it was found that the CHA zeolite membrane prepared by the method described above can provide and maintain a high $CO_2$ separation capacity even in a feed condition containing water, regardless of the temperature or pressure of the flue gas.

Accordingly, in another aspect, the present invention provides a CHA zeolite membrane produced by the method, wherein the CHA zeolite membrane has a defect porosity of 0.1 to 1% and a z-axis tortuosity (tortuosity in a thickness direction of the defect) of 1 to 2.

In still another aspect, the present invention is directed to a method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite membrane.

In the present invention, the separation factor of $CO_2/N_2$ in the flue gas separation process containing water may be 10 to 30, and the separation factor of $CO_2/CH_4$ in the upgrading process of biogas containing water may be 10 to 80.

In the use of the CHA zeolite membrane according to the present invention, the separation of carbon dioxide includes all of separation, capturing and removal of carbon dioxide.

EXAMPLES

Hereinafter, the present invention will be described in more detail with reference to examples. However, it will be obvious to those skilled in the art that these examples are provided only for illustration of the present invention and should not be construed as limiting the scope of the present invention.

Example

Preparation Example 1: Fabrication of CHA Membrane

Synthesis of Seed Particle and Seed Deposition

All-silica CHA (Si-CHA) zeolite particles were synthesized following a literature procedure (Diaz-Cabanas, M. J. et al., Synthesis and Structure of Pure $SiO_2$ Chabazite: The $SiO_2$ Polymorph with the Lowest Framework Density. *Chem. Commun.* 1998, 1881-1882). N,N,N-trimethyl-1-adamantammonium hydroxide (TMAdaOH, 25 wt % in water, Sachem Inc.) was poured into distilled (DI) water in a Teflon beaker. Ethanol (anhydrous 200 proof, ≥99.5%, Sigma-Aldrich) was subsequently added to the mixture, followed by the addition of tetraethyl orthosilicate (TEOS 98%, Sigma-Aldrich), which served as the silica source. The synthesis mixture was hydrolyzed overnight at room temperature and was further dried until the ratio of $SiO_2$ to water reached ~2.4. After that, the synthesis mixture became almost solid. Finally, an HF solution (48%, Sigma-Aldrich) was added dropwise to the solid-like synthesis mixture. The final molar composition was 10 $SiO_2$: 5 TMAdaOH: 5 HF: 30 $H_2O$. The resultant synthesis mixture was transferred to a Teflon liner in an autoclave for reaction. The autoclave containing the synthesis mixture was placed on a rotating rack in a preheated oven at 155° C., and after completing the reaction for 42 hours with rotation, the reaction was quenched with tap water. The resulting particles were recovered by repeating centrifugation and washing five times. In addition, the recovered particles were calcined at ~600° C. for 12 hours at a ramp rate of 1° C.·min$^{-1}$ under air flow (200 mL min$^{-1}$).

The seed deposition procedure has been reported elsewhere (Kim, E. et al., Uniform Si-CHA Zeolite Layers Formed by a Selective Sonication-Assisted Deposition Method. *Angew. Chem., Int. Ed.* 2013, 52, 5280-5284; Kim, E. et al., On the Synthesis and Characterization of All-silica CHA Zeolite Particles. *Microporous Mesoporous Mat.* 2014, 184, 47-54). Briefly, —0.05 g of Si-CHA particles were added to ~50 mL of anhydrous toluene in a specially designed glass reactor with flowing argon (~20 mL·min$^{-1}$). After that, an α-$Al_2O_3$ disc sandwiched between two cover glasses was fixed on a comb-shaped Teflon holder and placed in the suspension inside the glass reactor. Detailed information about the placement of the disc on the Teflon holder can be found in (Choi, J. et al., MFI Zeolite Membranes from a- and Randomly Oriented Monolayers. *Adsorption* 2006, 12, 339-360). About 50 mL of anhydrous toluene was poured into the glass reactor under an argon environment. Subsequently, the glass reactor was sealed with Parafilm and ultra-sonicated (UC-10P, JEIO Tech, South Korea) for ~20 min. The seeded α-$Al_2O_3$ disc was calcined at 450° C. for 4 hours at a ramp rate of 1° C.·min$^{-1}$.

Figure 12:
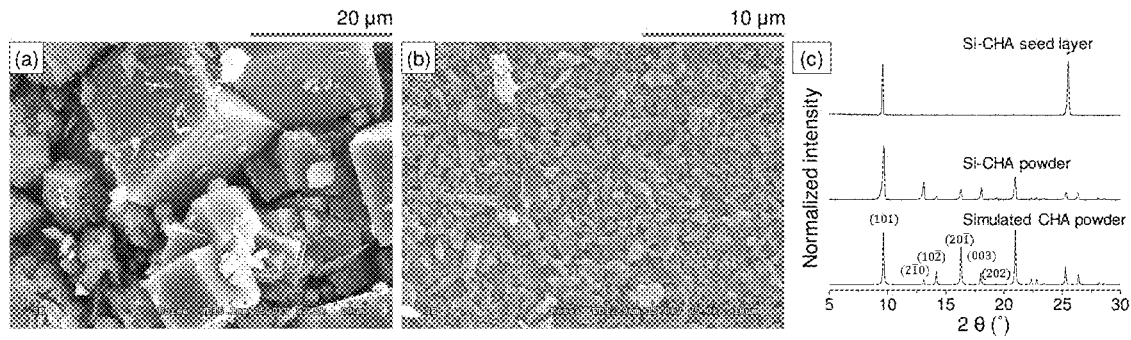
FIG. 12 shows scanning electron microscope (SEM) results of (a) Si-CHA particles and (b) Si-CHA seed layers of the membrane and (c) XRD results corresponding thereto according to one embodiment of the present invention.

FIG. 12 shows the scanning electron microscopy (SEM) images of the Si-CHA particles obtained by following the protocol described above. As reported in previous studies by the present inventors (Kim, E. et al., Uniform Si-CHA Zeolite Layers Formed by a Selective Sonication-Assisted Deposition Method. *Angew. Chem., Int. Ed.* 2013, 52, 5280-5284; Kim, E. et al., On the Synthesis and Characterization of All-silica CHA Zeolite Particles. *Microporous Mesoporous Mat.* 2014, 184, 47-54), a majority of cubic-like Si-CHA particles having a wide size distribution were observed, as well as a minor portion of plate-like Si-CHA particles (indicated by red arrows in FIG. 12). Despite being the minor portion, the plate-like Si-CHA particles were selectively deposited onto α-$Al_2O_3$ discs to form a uniform seed layer by controlling the access to the disc surface following the above-mentioned approach reported in the previous study by the present inventors. Because of the broad size distribution, the large cubic-like Si-CHA particles were not appropriate for forming a uniform seed layer, which is critical in forming a continuous membrane via the secondary growth methodology (Choi, J. et al., Uniformly a-Oriented MFI Zeolite Films by Secondary Growth. *Angew. Chem., Int. Ed.* 2006, 45, 1154-1158; Lai, Z. et al., Microstructural Optimization of a Zeolite Membrane for Organic Vapor Separation. *Science* 2003, 300, 456-460). FIG. 12c shows that the deposited plate-like CHA particles were preferentially aligned. In particular, the X-ray diffraction (XRD) peak corresponding to the h0h-plane was pronounced, while the others observed in the powder XRD patterns almost vanished. The resulting seed layer was comparable to that reported in the literature.

CHA Film Growth

Three types of CHA zeolite membranes were synthesized by varying the Si/Al ratio in the synthetic precursor. First, a certain amount of TMAdaOH, Al(OH)$_3$ (for a finite Si/Al ratio), and CAB-O-SIL (CAB-O-Sil® M-5, Cabot Corporation) as a silica source were added to deionized water, and the mixture was further shaken using a shaking machine (Lab Companion, SI-300R, South Korea) overnight at room temperature. After that, a certain amount of NaOH was added to the well-mixed synthetic precursor, followed by shaking overnight at room temperature. The final molar compositions of the three synthetic precursors for secondary growth were 20 TMAdaOH: 100 SiO$_2$: 4,400 H$_2$O: 20 NaOH: x Al(OH)$_3$, where x=0, 1, and 5 correspond to the nominal Si/Al ratios of infinity, 100, and 20, respectively. The prepared synthetic precursor was poured into a Teflon liner where a seeded α-Al$_2$O$_3$ disc had been placed vertically with the help of a Teflon holder. The Teflon liner was placed in an autoclave and the autoclave was moved to an oven preheated to 160° C. The hydrothermal reaction for secondary growth was carried out at 160° C. for 6 days. After the reaction had finished, the autoclave was quenched with tap water. The as-synthesized membranes were recovered from the autoclave, washed with copious water, and dried at room temperature. The dried membranes were further calcined at 550° C. for 12 hours at a heating ramp rate of 0.5° C.·min$^{-1}$ under air flow (200 mL·min$^{-1}$). For convenience, the calcined membrane samples are referred to as "CHA_x", where x indicates the nominal Si/Al ratio in the synthetic precursor.

Example 1: Characterization of Membrane

SEM images of CHA particles, layers and separators were obtained using a Hitachi S-4300. Prior to analysis, all samples were coated with Pt-sputtering (Hitachi S-4300). The crystallinity of the Si-CHA zeolites and orientation of the Si-CHA layers and separators were determined through XRD (Rigaku Model D/Max-2,500 V/PC diffractometer, Japan) in the θ/2θ array using Cu Kα radiation (40 kV, 100 mA, λ=0.154 nm). Powder XRD patterns of CHA zeolites were generated using the Mercury program (www.ccdc.cam.ac.uk). The CHA Zeolite Decision Information File (CIF) was downloaded from www.iza-online.org. The chemical content from the membrane surface to the portion of the α-Al$_2$O$_3$ support adjacent to the CHA film was analyzed by energy dispersive X-ray analysis (EDX, Hitachi S-4800). This was used to evaluate the hydrophobicity of the separator. In addition, the contact angle of the water droplets on the membrane sample at room temperature was measured using a light microscope (General Type Phoenix 300, Surface Electro Optics) and recorded over time. To investigate the inner structures of the CHA membranes, FCOM (Zeiss LSM-700) was used after the membranes had been impregnated with a fluorescent dye (fluorescein sodium salt, empirical formula: C$_{20}$H$_{10}$Na$_2$O$_5$, Sigma-Aldrich (Product No.: F6377)) having an approximate diameter of ~1 nm. In the present invention, membrane staining was performed for 12, 24, and 96 hours. In addition, a simple screening test suitable for excluding highly defective membranes was used. This test involves placing several droplets of 1 mM fluorescent dye solution on the membrane surfaces and observing the dye distribution with time.

The Wicke-Kallenbach mode was adopted for measuring the permeation rates of CO$_2$ and N$_2$ (or CH$_4$). The total pressures of both feed and permeate sides were maintained at 1 atm. In order to examine the effect of water on the membrane, the feed gas was humidified. Specifically, the partial pressures of CO$_2$/N$_2$/H$_2$O (or CO$_2$/CH$_4$/H$_2$O) were 48.5 kPa/48.5 kPa/3 kPa, respectively. A total flow rate of 100 mL·min$^{-1}$ of CO$_2$ and N$_2$ (or CH$_4$) on a dry basis was fed to the membrane, and the CO$_2$/N$_2$ or CO$_2$/CH$_4$ mixture permeated through the membrane. The permeate was carried by He sweep gas (100 mL·min$^{-1}$) and was analyzed on-line by a gas chromatography (GC) system (YL 6100 GC for CO$_2$/N$_2$ and YL 6500 GC for CO$_2$/CH$_4$, Young Lin Instruments, South Korea) equipped with a packed column (6 ft×⅛" Porapak T for CO$_2$/N$_2$ and 30 m×0.320 mm GS-GasPro for CO$_2$/CH$_4$) and a thermal conductivity detector (TCD) for CO$_2$/N$_2$ analysis and a pulsed discharge ionization detector (PDD) for CO$_2$/CH$_4$ analysis. For reliable analysis, ~5 mL·min$^{-1}$ of CH$_4$ for CO$_2$/N$_2$ and H$_2$ for CO$_2$/CH$_4$ measurements were added to the swept permeate gas stream before reaching the GC system. In addition, permeation tests with respect to the different feed humidities and longer durations at 50° C. were conducted with CHA_100 and _∞. In order to evaluate the effect of the humidity on the separation performance of the membrane samples at 50° C., the permeation tests were conducted at relative humidities of 0%, 26%, 60%, and 100% at 50° C. for 12 hours each. The relative humidities of 0%, 26%, 60% and 100% at 50° C. correspond to water vapor partial pressures of approximately 0, 3, 7 and 12 kPa, respectively. The long-term stability tests were conducted at 50° C. at the saturated water vapor of ~12 kPa. To expedite any deactivation, the membrane samples were heated to 200° C. between the long-term measurements at 50° C. Specifically, the permeation tests were performed at 50° C. for 3 days, then at 200° C. for 2 days, and then again at 50° C. for 3 days.

Formation of CHA Membranes

Figure 2:
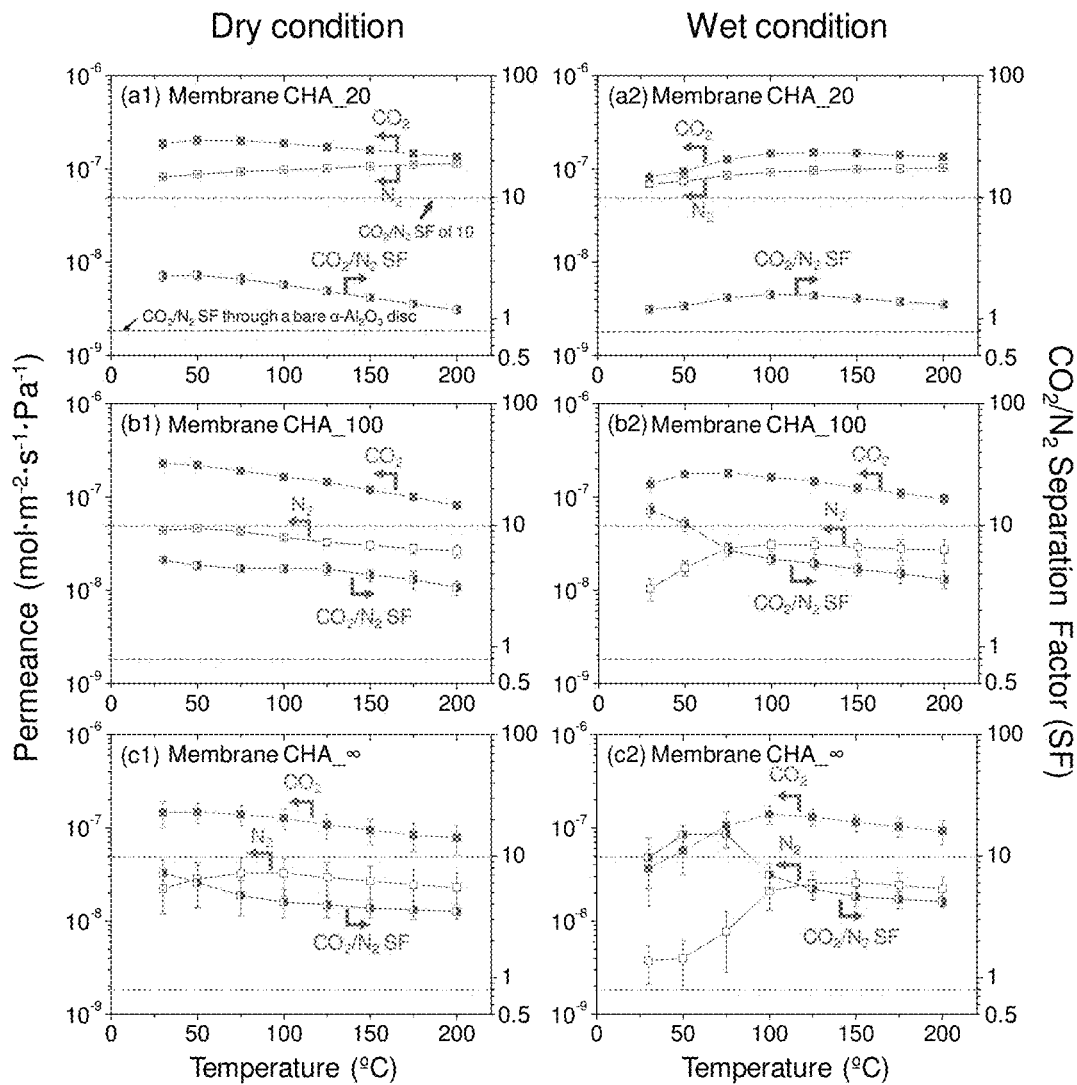
FIG. 2 shows graphs of the $CO_2/N_2$ permeance of the membrane according to one embodiment of the present invention.
Figure 3:
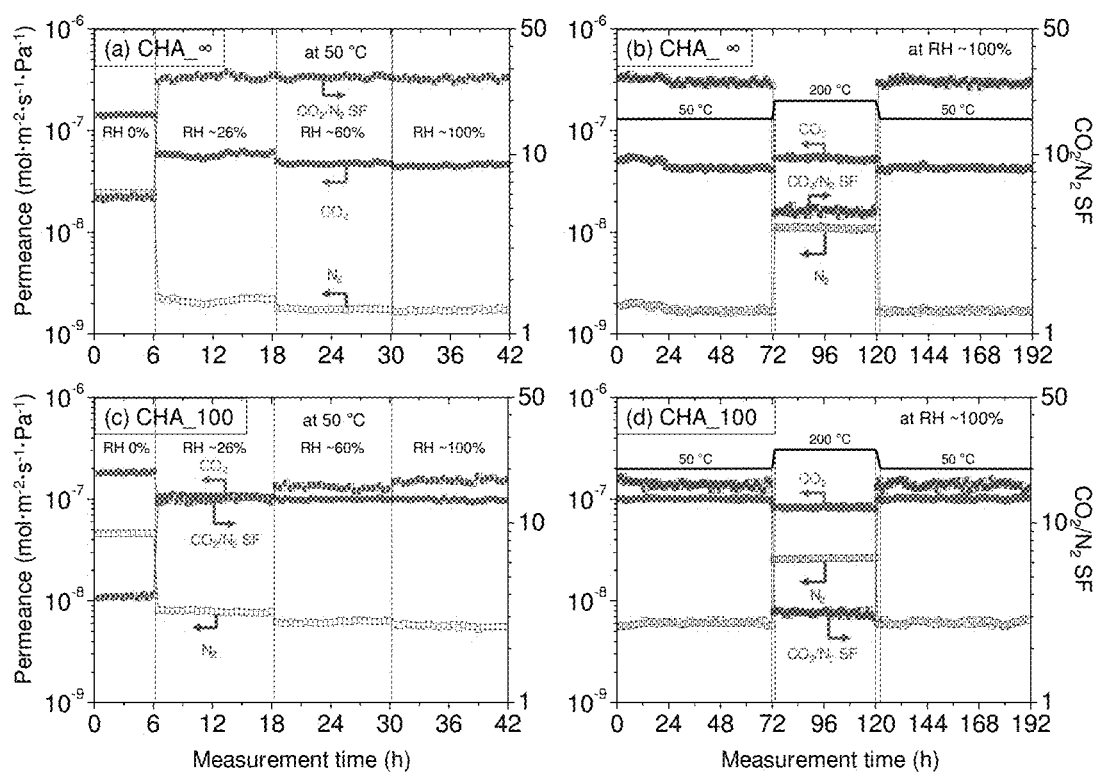
FIG. 3 shows graphs of the $CO_2$ and $N_2$ permeance of the membrane according to one embodiment of the present invention.

FIG. 1a1-c1 and 1a2-c2 reveal that the secondary growth of the seed layer (shown in FIG. S1b) led to well-intergrown, continuous films at SEM resolution for all three Si/Al ratio cases (20, 100, and ∞) considered in the present invention. CHA_20 and _∞ were composed of grains similar to the cubic-like CHA particles (FIG. 12). It appears that these grains were aligned in the diagonal direction along the membrane thickness. As a result, the protruding edges of the cubic-like particles led to rough surfaces in CHA_20 and _∞. On the other hand, the grains on the top surface of CHA_100 were smooth and larger. The thicknesses of CHA_20, _100, and _∞ were estimated to be 2.2, 9.2, and 2 μm, respectively (FIG. 1a2-c2). Further measurements provided average and standard-deviation values for the membrane thickness (Table 1). However, the corresponding XRD patterns confirmed a random out-of-plane orientation (FIGS. 1a3 and 1c3), indicating the failure of the preferred alignment of the grains. In addition, the XRD pattern of CHA_100 showed that it did not have a pronounced degree of preferred out-of-plane orientation, although the intensities of some XRD peaks, such as those corresponding to the (2 1̄0) (201̄) and planes, were slightly increased relative to those in the calcined Si-CHA powder (FIG. 1b3). In particular, the increased intensity of the XRD peak corresponding to the (21̄0) (plane indicates that the 8 MR channels were positioned in the out-of-plane direction (that is, perpendicular to the zeolite surface) and the corresponding CO$_2$ permeance would be increased by a shorter passage through the membrane.

TABLE 1

| Sample | Thickness (μm) |
|---|---|
| CHA_20 | 1.6 ± 0.4 |
| CHA_100 | 9.3 ± 0.9 |
| CHA_∞ | 2.3 ± 0.7 |

Example 2: $CO_2$ Permselectivities of CHA Membranes

Example 2-1: $CO_2/N_2$ Separation Performance Under Dry Conditions

Despite the continuity observed at SEM resolution, the CHA film synthesized with a nominal Si/Al ratio of 20 (CHA_20) showed very poor $CO_2/N_2$ separation performance under dry conditions. The maximum (max) $CO_2/N_2$ SF was estimated to be 2.2±0.2, which is relatively close to that (~0.8) determined based on Knudsen diffusion (FIG. 2a1). In addition, the poor $CO_2/N_2$ separation performance of CHA_20 was similar to that of the CHA membranes reported in a previous study by the present inventors (Kim, E. et al., Chemical Vapor Deposition on Chabazite (CHA) Zeolite Membranes for Effective Post-Combustion $CO_2$ Capture. Environ. Sci. Technol. 2014, 48, 14828-14836). The low maximum $CO_2/N_2$ SF of 2.2 was much smaller than the expected value of ~10-20 through the CHA membranes, indicating the presence of pronounced, unwanted non-zeolitic parts in CHA_20 (Kim, E. et al., Chemical Vapor Deposition on Chabazite (CHA) Zeolite Membranes for Effective Post-Combustion $CO_2$ Capture. Environ. Sci. Technol. 2014, 48, 14828-14836; Krishna, R. et al., Segregation Effects in Adsorption of $CO_2$-Containing Mixtures and Their Consequences for Separation Selectivities in Cage-Type Zeolites. Sep. Purif. Technol. 2008, 61, 414-423). Compared to CHA_20, CHA_100 and _∞ showed higher maximum $CO_2/N_2$ SFs of ~5.2±0.1 and ~7.3±2.0, respectively (FIG. 2b1-c1). It was noted that the $CO_2/N_2$ SFs monotonically decreased with temperature, similar to the trend of the previously reported SSZ-13 membranes with the maximum $CO_2/N_2$ SF being ~10-11 at ~20-25° C. Among the three membranes in the present invention, CHA_∞ showed the highest maximum $CO_2/N_2$ SF at 30° C. under dry conditions. This suggests that a small amount of Al in the secondary growth solution is beneficial for obtaining a less-defective membrane structure. The monotonic increase in the separation performance with the increase in the Si/Al ratio in the synthetic precursor is similar to that observed in a previous study. However, in that paper, it was reported that the use of a small amount of Al in the synthetic precursor (for example, Si/Al ratio of 125) led to the formation of undesired AFI zeolite membranes. However, despite the absence of Al, the synthesis of high-performance CHA membranes was still possible (CHA_∞ in FIG. 2c1). To the best of common knowledge, the secondary growth of the CHA seed layer with a nominal Si/Al ratio of infinity in the synthetic precursor is the first example of the fabrication of a high-performance CHA membrane (here, CHA_∞).

In addition, the $CO_2$ permeance through CHA_100 was higher than that through CHA_∞ (FIG. 2b1-c1), even though the corresponding membrane (~9.2 μm) was much thicker than CHA_∞ (~2 μm) (FIG. 1b2-c2). Because the permeance across a membrane is generally reciprocal to the membrane thickness, such behavior indicates a beneficial contribution of other membrane properties. Among the possible factors, the good $CO_2$ permeance is due to the preferred alignment of the 8 MR channels in CHA_100 (FIG. 1b3). As mentioned above, the XRD peak arising from the (2$\overline{1}$0) plane, which is perpendicular to the 8 MR channel in the [100] axis, was pronounced. Furthermore, the intensity of the XRD peak corresponding to the (003) plane, which is perpendicular to the 6 MR pore in the [001] axis, was reduced. This indicates that the 8 MR channel was more aligned along the membrane thickness, while the mass transfer inhibition by the 6 MR pores was significantly weakened. It seems that the preferred alignment of the 8 MR channels helped to increase the $CO_2$ permeance, despite the greater thickness of CHA_100. Nevertheless, at this point, it is impossible to exclude the possible contribution of molecular transport through non-zeolitic defects to the higher $CO_2$ permeance, and this will be discussed in detail later.

Previously, Si-CHA zeolite seed particles have been synthesized in the presence of hydrofluoric acid (HF), where $F^-$ served as an anionic counterpart with respect to the cationic structure directing agent (SDA, here $TMAda^+$). However, the direct adoption of the synthetic protocol for the secondary growth of the CHA seed layer would not work, apparently due to the dissolution of the pre-deposited CHA seed particles by HF. Recently, the use of TMAdaF as a SDA (which can be considered to have the combined role of TMAdaOH and HF) instead of the conventional TMAdaOH SDA has been shown to be effective for the fabrication of CHA membranes via secondary growth. Nevertheless, the use of TMAdaOH is highly desirable for manufacturing high-performance CHA membranes, because it does not require an additional, sophisticated procedure to obtain TMAdaF.

Example 2.2: $CO_2/N_2$ Separation Performance Under Wet Conditions

Figure 13:
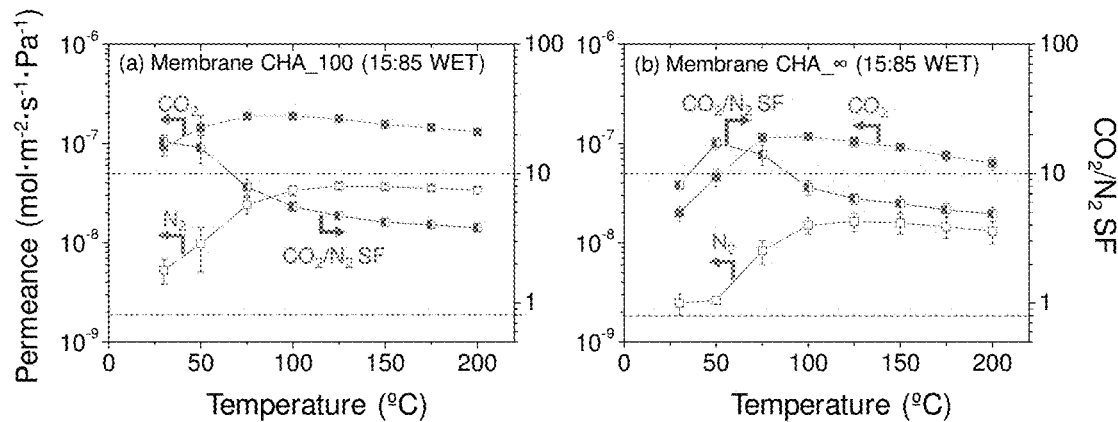
FIG. 13 shows $CO_2/N_2$ permeance and $CO_2/N_2$ SF of (a) CHA_100 and (b) CHA_∞ depending on the temperature of a membrane when a wet gas mixture having a composition of 14.7 kPa $CO_2$/83.3 kPa $N_2$/3 kPa $H_2O$ is flowed according to one embodiment of the present invention.

Considering the third main component, $H_2O$ vapor, in the $CO_2$-containing streams, the $CO_2$ permselectivities of the three CHA membranes under wet conditions are investigated. Specifically, CHA_20, which showed poor $CO_2/N_2$ separation performance (maximum SF of ~2.2 at 30° C.) under dry conditions, also exhibited a low $CO_2/N_2$ separation performance (maximum SF of ~1.6 at 100° C.) under wet conditions (FIG. 2a2), confirming the pronounced presence of undesired non-zeolitic defects. The increase in the nominal Si/Al ratio of the secondary growth precursor from 20 to 100 led to an improvement in the maximum $CO_2/N_2$ SF from ~5.2±0.1 under dry conditions to ~13.4 ±1.8 under wet conditions at the same temperature, 30° C. (CHA_100 in FIG. 2b1-b2). This trend was also observed for CHA_∞ (FIG. 2c1-c2). However, a difference was found; although the $CO_2/N_2$ SF of CHA_100 monotonically decreased with temperature (FIG. 2b2), that of CHA_∞ showed a maximum $CO_2/N_2$ SFs of ~15 in the temperature range of 50-75° C., not 30° C., under wet conditions (FIG. 2c2). Considering the representative temperature (~50-75° C.) of flue gas, the comparable $CO_2/N_2$ SFs of ~15 at ~50-75° C. through CHA_∞ is highly desirable for effective membrane-based carbon capture. Notably, despite the use of the same seed layer, the appropriate choice of Si/Al ratio in the secondary growth precursor was critical for obtaining high-performance $CO_2$-permselective CHA membranes. Moreover, the feed composition of the simulated post-combustion flue gas (here, at a $CO_2$ partial pressure of ~15 kPa) was considered to investigate the separation performance of CHA_100 and _∞ in the presence of $H_2O$ in the feed (FIG. 13). The results are comparable with those observed for equimolar $CO_2/N_2$ binary feeds (FIG. 2b2-c2). This result could be ascribed to the almost linear adsorption behavior of both $CO_2$ and $N_2$ molecules inside the CHA zeolites.

Despite previous results concerning water-assisted $CO_2$ permselectivity, the monotonic decrease in the $CO_2/N_2$ SF of the SSZ-13 membrane with increased temperature makes it undesirable for practical use. In particular, considering the plausible temperature fluctuations of flue gas streams around the representative temperature (~50° C.), establishment of maximum separation performance in the temperature range of ~50-75° C. is highly desirable. In this respect, CHA_∞ prepared in the present invention, which had a $CO_2/N_2$ SF greater than 10 in the presence of $H_2O$ vapor in a temperature range of ~50-75° C., meets the above-mentioned requirement for practical use.

The improved $CO_2/N_2$ separation performance under wet conditions can be ascribed to the hydrophobic surface of the CHA membranes. Because of the smaller size of the $H_2O$ molecule (0.265 nm), preventing the entry of $H_2O$ into the CHA zeolite pores is not a sound approach for minimizing the $H_2O$ permeation rate. Instead, the control of the hydrophobicity of the surface of the CHA membranes is effective for reducing the adsorption of $H_2O$ and, thus, its permeation rate. The EDX analysis shown in FIG. 1a2-c2 reveals that there is a siliceous component near the surface in all three CHA membranes. Considering the trend in the distribution of Al atoms along the membrane thickness, it appears that CHA_20 had a higher portion of Al atoms compared to CHA_∞. It was noted that the proportion of Si atoms approached zero after passing the interface in CHA_∞, whereas that in CHA_20 did not reach zero, suggesting the possible existence of CHA zeolites deep inside the α-$Al_2O_3$ disc support. In contrast, a higher siliceous portion was observed throughout the membrane thickness for CHA_100. Accordingly, CHA_100 could be considered to be the most hydrophobic membrane of the three prepared membranes.

Figure 14:
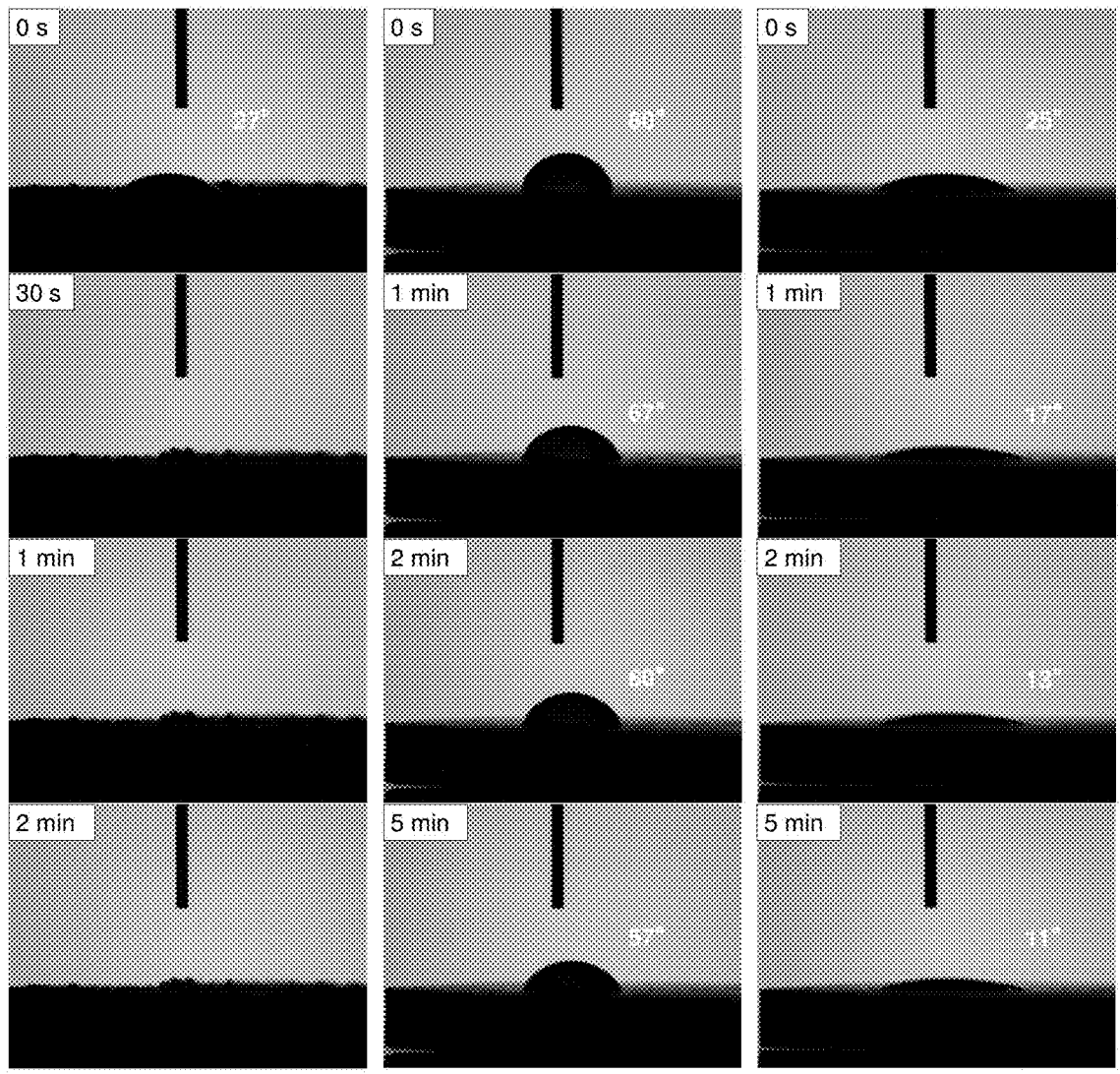
FIG. 14 is an image obtained after dropping water on (a) CHA_20 (left), (b) CHA_100 (middle), and (c) CHA_∞ (right) membrane according to one embodiment of the present invention.

To clarify the hydrophobicities of the CHA membranes, the contact angles of water droplets on the membrane surfaces are measured (FIG. 14). The water droplet on CHA_20 was immediately infiltrated into the membrane sample, apparently into the non-zeolitic defects, thus failing a reliable test. CHA_∞, which clearly contained a lower Al portion than CHA_20 (FIGS. 1a2 and 1c2), had a water droplet contact angle of ~25°. This contact angle indicates the lower hydrophobicity of CHA_∞, especially compared to CHA_100 (contact angle of ~80°). Unlike highly defective CHA_20, CHA_100 and _∞ both held the water droplet for up to duration of 5 minutes (FIG. 14), suggesting narrower or fewer defects in these two membranes. Both the EDX and contact angle measurements led us to the conclusion that the surface of CHA_100 was most hydrophobic, followed by CHA_∞, while the surface of CHA_20 was not continuous, possibly because of the insufficient intergrowth during secondary growth.

It was noted that the dry $CO_2/N_2$ SF of CHA_∞ was higher that of CHA_100 (FIG. 2b1-c1), possibly indicating a lower degree of defects in CHA_∞. Despite the expected lower degree of defects in CHA_∞, its wet $CO_2/N_2$ separation performance was inferior to that of CHA_100, which showed higher $CO_2$ permeance and a marked $CO_2/N_2$ SF at ~30° C. (FIG. 2b2-c2). Because CHA_100 was the most hydrophobic membrane (FIGS. 1a2 and 14), the degree of $CO_2$ permeance reduction arising from the presence of $H_2O$ vapor was much lower than that for CHA_∞ (FIGS. 2b1-b2 and 2c1-c2). Despite the lower $CO_2$ permeance, CHA_∞ exhibited significant $CO_2/N_2$ SFs (~9.7-15.2) throughout ~30-75° C. (FIG. 2c2). This steady $CO_2/N_2$ SF at ~30-75° C. indicates robustness with respect to the plausible temperature-fluctuation of the flue gas or biogas stream of ~50° C. in the presence of $H_2O$ vapor. Considering that the final $CO_2/N_2$ separation performance of CHA membranes with some defects is a coupled function of (1) the non-zeolitic defects associated with the physisorption of $H_2O$ vapor and (2) intrinsic zeolitic parts, the $CO_2/N_2$ separation performance shown in FIG. 2b2-c2 needs to be related to the defect structure.

The good separation performance of CHA membranes under wet conditions (FIG. 2c2) is not expected to deteriorate over time at temperatures below 100° C., mainly because of the robust CHA zeolite structure. In order to confirm this expectation, the less hydrophobic CHA_∞ was tested first, because this is more likely to show deactivation if any occurs. The response of CHA_∞ with respect to the simulated $CO_2/N_2$ feed (a molar composition of 15:85 on a dry basis) at ~50° C. with relative humidities of 0%, 26%, 60% and 100% was investigated (FIG. 3a). An enhancement in the $CO_2$ permselectivity (equivalent to that observed at 50° C. in FIG. 13b) caused by water vapor was observed immediately after the addition of water vapor (from 0% to 26%) and was maintained. Furthermore, the addition of more water vapor to relative humidities of 60% and 100% reduced the permeances of both $CO_2$ and $N_2$ molecules to the same extent, so that the corresponding $CO_2/N_2$ SF remained constant at about 27. In addition, the rigorous long-term stability test of CHA_∞ in the simulated $CO_2/N_2$ feed at 50° C. with a relative humidity of 100% confirmed its robustness (FIG. 3b). Even after its exposure to harsher feed conditions (at 200° C. for 2 days), the $CO_2/N_2$ separation performance on reaching the target temperature of 50° C. was fully recovered and maintained for an additional 3 days (FIG. 3b), revealing the robustness of the CHA zeolite inorganic membranes. In addition, the more hydrophobic CHA_100 showed an improved and steady $CO_2/N_2$ SF immediately after adding water vapor to the dry feed (FIG. 3c). Desirably, such $CO_2/N_2$ SF was well preserved. Further addition of water vapor (relative humidities of 60% and 100%) selectively reduced the permeance of $N_2$ molecules and, accordingly, increased the $CO_2/N_2$ SF monotonically.

The long-term stability test of CHA_100 in the simulated $CO_2/N_2$ feed at 50° C. with a relative humidity of 100% (FIG. 3d) also confirmed its high suitability for practical use (that is, low $CO_2$ partial pressures and under wet conditions). Apparently, the harsh treatment at 200° C. for 2 days did not damage the membrane performance. In addition, the $CO_2/N_2$ separation performance before the treatment was recovered well and maintained for an additional 3 days (FIG. 3d).

Example 3: $CO_2/CH_4$ Separation Performance of CHA Membrane

Figure 4:
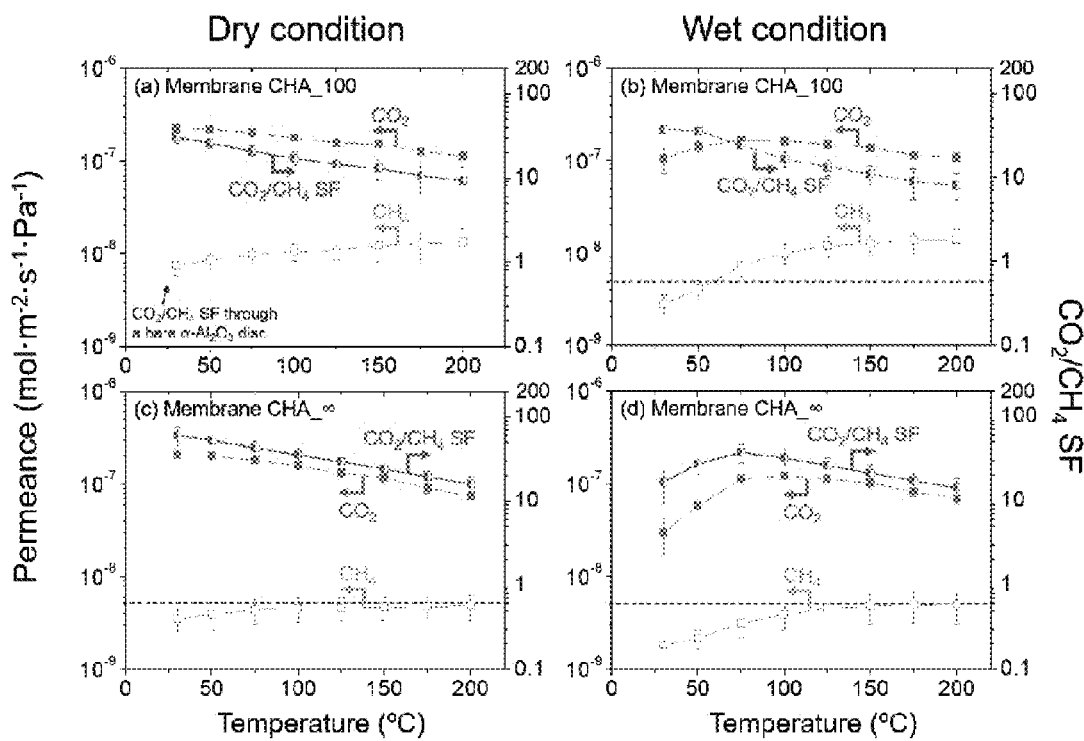
FIG. 4 shows graphs of the permeance and $CO_2/CH_4$ SFs for a mixture with $CO_2$ and $CH_4$ equimolar ratios through (a)-(b) CHA_100 and (c)-(d) CHA_∞ according to one embodiment of the present invention.
Figure 5:
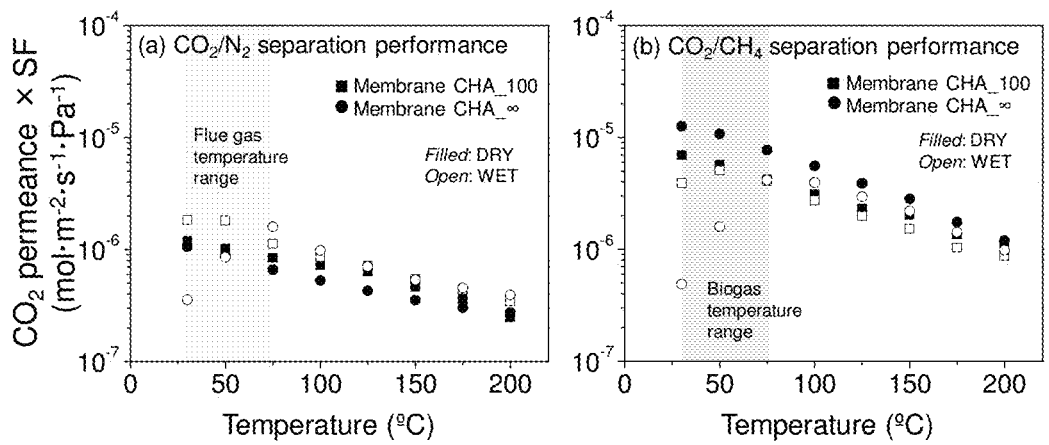
FIG. 5 shows graphs of (a) $CO_2$ permeance×$CO_2/N_2$ SF and (b) $CO_2$ permeance×$CO_2/CH_4$ SF expressed as a function of temperature according to one embodiment of the present invention.

In addition to the $CO_2/N_2$ separation performance, the $CO_2/CH_4$ separation performance of CHA_100 and _∞ was also measured (FIG. 4). As expected from their high $CO_2/N_2$ biogas separation performance (FIG. 2), both CHA_100 and _∞ showed good $CO_2/CH_4$ separation performance under dry conditions, having corresponding maximum $CO_2/CH_4$ SFs as high as ~31 and ~61, respectively, at 30° C. (FIGS. 4a and 4c). The observation of higher $CO_2/CH_4$ SFs than $CO_2/N_2$ SFs was expected, because the diffusional behavior inside the microporous channels is a function of molecular size ($CH_4$; 0.38 nm vs. $N_2$; 0.364 nm). Furthermore, the $CO_2/CH_4$ permeation behaviors of both CHA_100 and _∞ under wet conditions (FIGS. 4b and 4d) exhibited a similar trend to that of the $CO_2/N_2$ separation performance under wet conditions (FIG. 2b2-c2). That is, the $CO_2$ permeance decreased, but the permeance of the larger $CH_4$ molecule was more significantly decreased at 30° C. It was noted that the permeance of $CH_4$ was much lower than that of $N_2$, apparently due to the significant inhibition of the larger $CH_4$ molecule by the physisorbed water molecules. Nevertheless, the wet $CO_2/CH_4$ SFs at 30° C. did not increase as much for CHA_100 and decreased for CHA_∞ [(1) dry SF of 30.7 vs. wet SF of 37.2 for CHA_100 and (2) dry SF of 60.8 vs. wet SF of 16.5 for CHA_∞]. Compared to that in the $CO_2/N_2$ binary mixture, the $CO_2$ permeance reduction was more significant in the $CO_2/CH_4$ binary mixture, as the presence of the larger $CH_4$ molecule was likely to disfavor the transport of $CO_2$. Nevertheless, it was found that for CHA_100, the reduction in $CO_2$ permeance was not considerable, whereas that for CHA_∞ was significantly decreased. This can be ascribed to the surface hydrophobicity/hydrophilicity, as reflected by the higher and lower contact angles of water droplets of 80° for CHA_100 and 25° for CHA_∞, respectively (FIG. 14). Considering the fact that the temperature of biogas streams is ~40-70° C. and they contain ~3-6% $H_2O$ vapor, CHA_100 and _∞, which showed wet $CO_2/CH_4$ SFs of 35.6 and 27.4, respectively, at 50° C., are suitable for the separation of $CO_2$ molecules from biogas streams.

At this point, the monotonically decreasing trend of $CO_2/N_2$ and $CO_2/CH_4$ SFs with an increase in temperature is not desirable for reliable use. Maximum performance should be achieved at ~50° C., a representative flue gas and biogas temperature, and should be insensitive to small changes in temperature. The low Si/Al ratio in the synthetic precursor could contribute to the formation of more defects in the zeolite membranes (as observed in CHA_20 in the present invention), possibly because of the relatively high polarity and repulsion of the growing zeolite grains. Concerning $CO_2/N_2$ and $CO_2/CH_4$ separation through SSZ-13 membranes under wet conditions, the permeances of $CO_2$, $N_2$, and $CH_4$ all decreased at temperatures below 100° C., but the corresponding SFs were increased because of the greater inhibition of the slowly permeating, larger $N_2$ and $CH_4$ molecules by $H_2O$. The Si/Al ratio in the synthetic precursor significantly affects the hydrophobicity of the final membrane surface and constituents, whereas defect formation is a sensitive function of thermal processing. As both factors influence the final performance, the identification of defects and the elucidation of their effects on the performance are also important for understanding and achieving high $CO_2$ permselectivities in realistic feeds (here, water-vapor-containing $CO_2$ streams).

Example 4: Investigation of Defects in CHA Membranes Through FCOM

Figure 6:
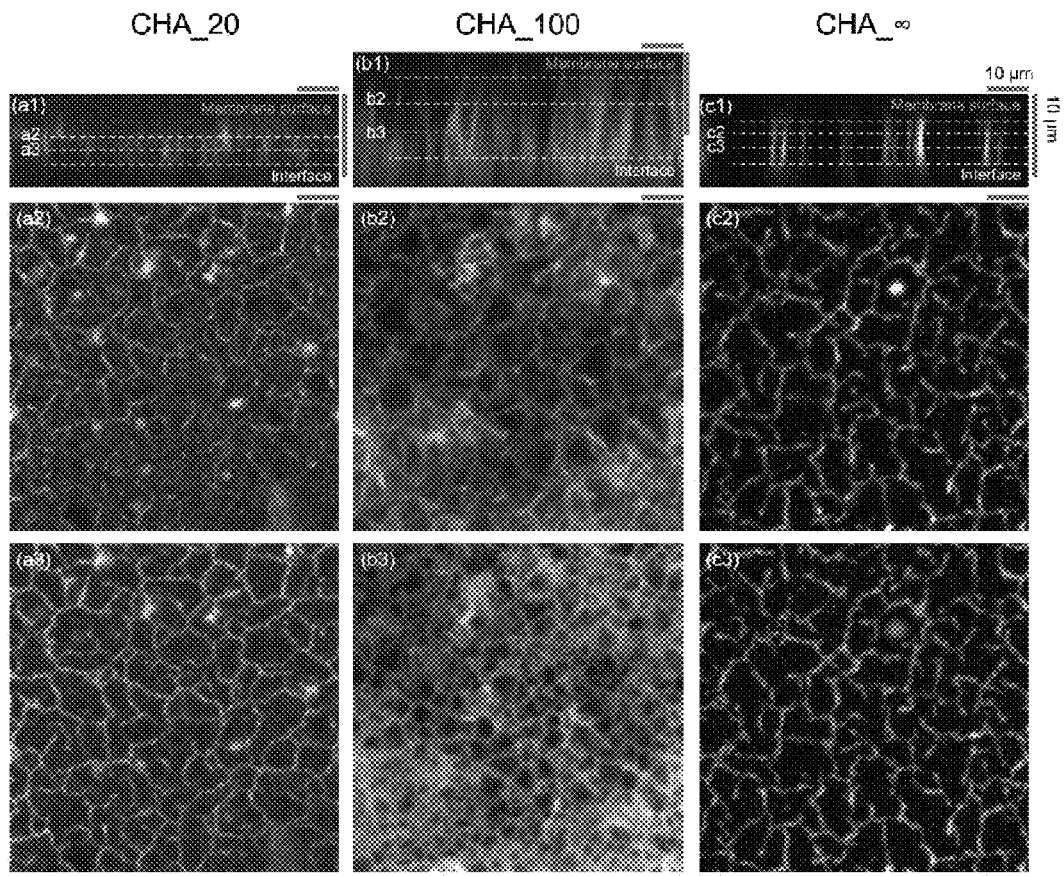
FIG. 6 shows FCOM images of a cross-section and a top surface of the membrane according to one embodiment of the present invention.

In addition to the measurement of $CO_2$ permselectivities of CHA_20, _100, and _∞, the defect structures were imaged via FCOM to understand the relationship between the structures and separation performance FCOM analysis is an attractive technique for studying the structure of defects embedded in a membrane without damaging the membrane structure. FIG. 6 reveals that despite the significant discrepancy in the separation performance of CHA_20 and _∞ (FIGS. 2a1-a2 and 2c1-c2), the cracks observed in the FCOM images were similar. Specifically, the cross-sectional view FCOM images show that the cracks, which constituted a defect network, as shown in the top-view FCOM images, propagated all the way down to the interface between the CHA membrane and the α-$Al_2O_3$ disc. Although it is challenging to determine the contribution of the cracks to the permeation rates in both CHA_20 and _∞ because of the limited optical resolution, the permeation results in both dry and wet conditions shown in FIGS. 2a1-a2 and 2c1-c2 confirm that CHA_20 was more defective than CHA_∞. Thus, the sizes or widths of the cracks in CHA_20 were apparently larger than those in CHA_∞. Despite the above-mentioned limited resolution, the FCOM images of the thicker CHA_100 membrane indicate that although the cracks also penetrated to the interface, the number of cracks was much larger than those in the other two membranes.

Figure 7:
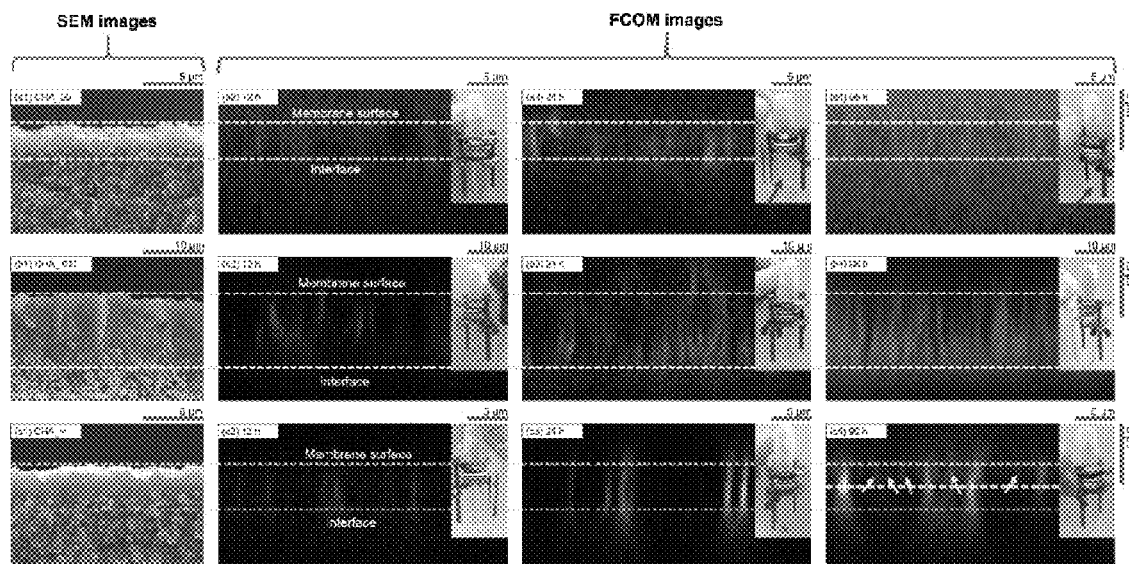
FIG. 7 shows cross-sectional SEM (1 column) and FCOM (2-4 columns) images of (a1)-(a4) CHA_20 (top), (b1)-(b4) CHA_100 (middle) and (c1)-(c4) CHA_∞ (bottom) measured at the same vertical magnification of the membrane according to one embodiment of the present invention.
Figure 8:
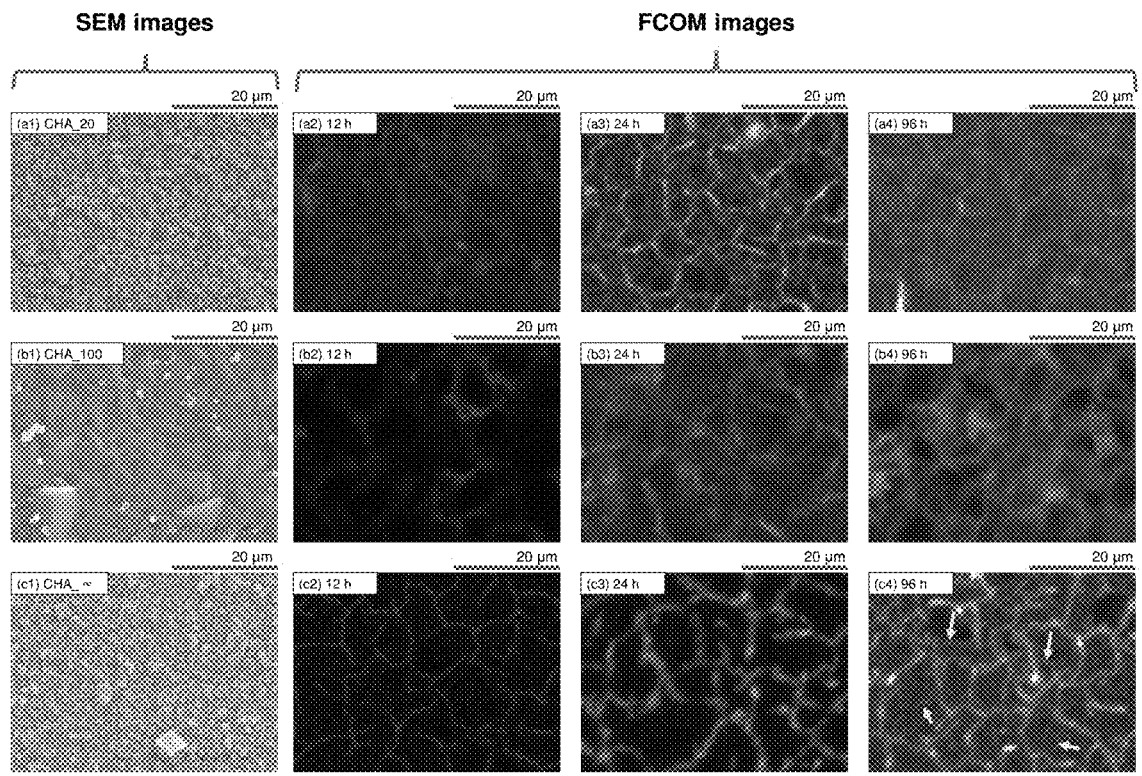
FIG. 8 shows top SEM (1 column) and FCOM (2-4 columns) images of (a1)-(a4) CHA_20 (top), (b1)-(b4) CHA_100 (middle) and (c1)-(c4) CHA_∞ (bottom) measured at the same vertical magnification of the membrane according to one embodiment of the present invention.
Figure 15:
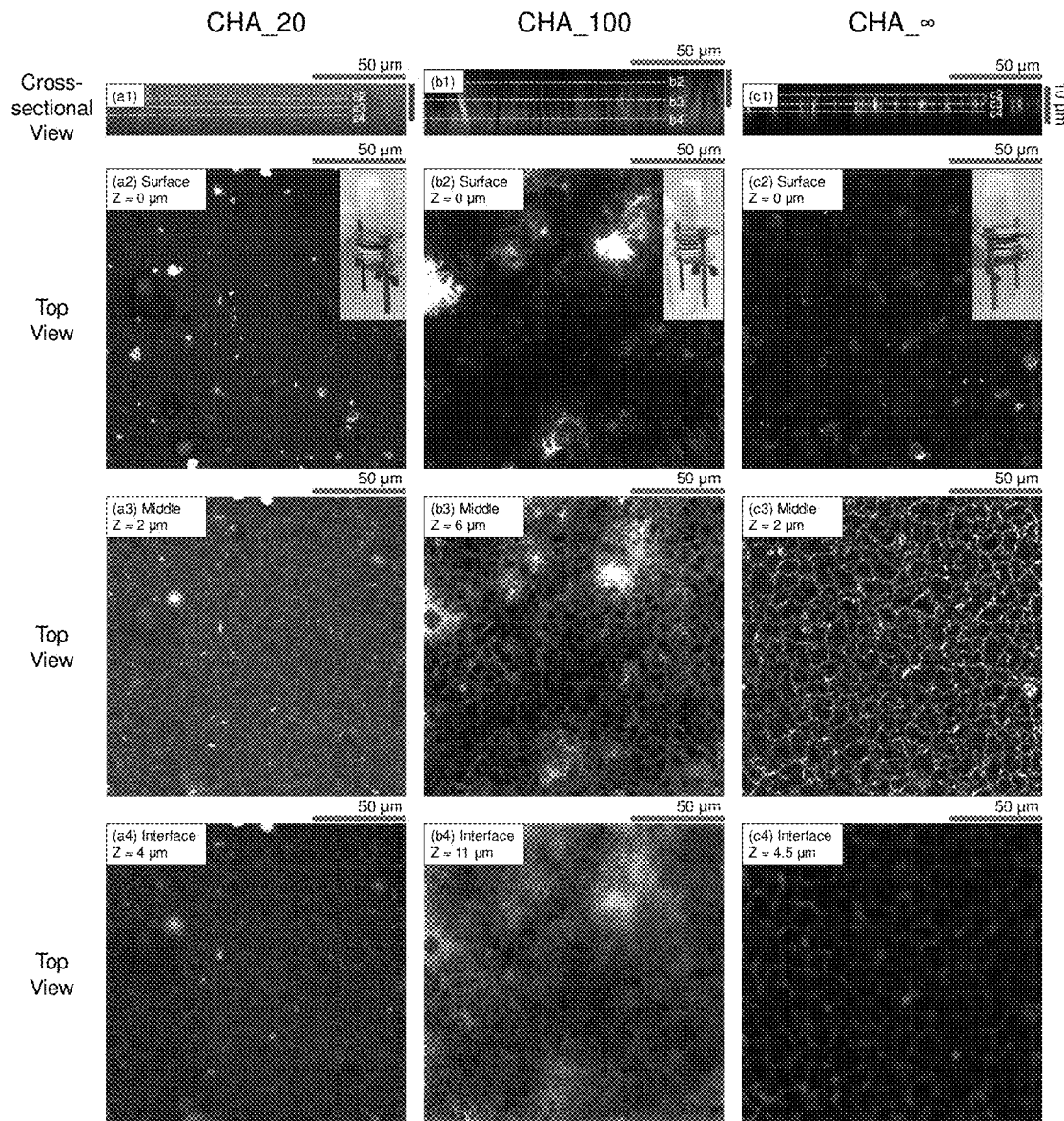
FIG. 15 is a cross-sectional FCOM image of (a1) CHA_20, (b1) CHA_100, and (c1) CHA_∞ membrane according to one embodiment of the present invention.
Figure 16:
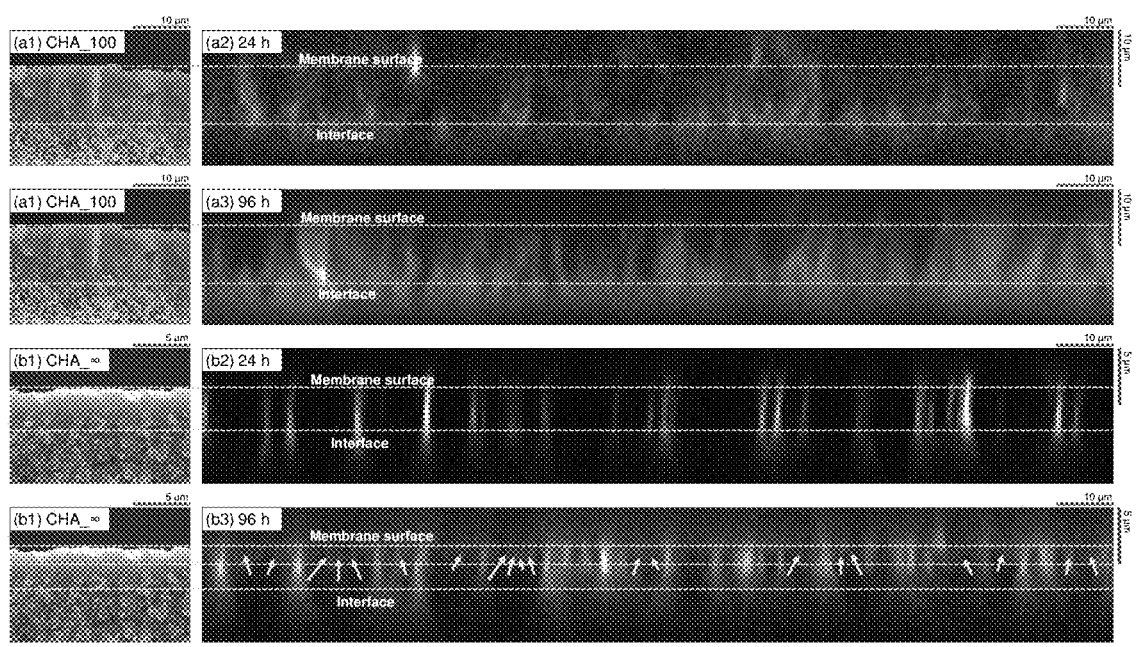
FIG. 16 is cross-sectional SEM and FCOM images of (a1)-(a3) CHA_100 and (b1)-(b3) CHA_∞ membrane according to one embodiment of the present invention.

Considering that the dyeing process is kinetically relevant, the dyeing duration was systematically varied from 12 hours through 24 hours to 96 hours (FIGS. 7 to 8). This approach is beneficial for obtaining a fundamental understanding of the defect structure. FIGS. 7 to 8 reveal that the degree of crack dyeing in CHA_20 and _∞ with respect to the dyeing duration was similar. The cracks, which propagated from the membrane surface to the interface, were accessed by the dye molecules after 12 hours (FIGS. 7a2-8a2 and 7c2-8c2) and saturated after 24 hours (FIGS. 7a3-8a3 and 7c3-8c3). However, dyeing for 96 hours resulted in a marked difference, while it was almost impossible to distinguish the cracks in CHA_20 because of the extremely high concentration of dye molecules (FIGS. 7a4 and 8a4), additional cracks were observed for CHA_∞, but these ended in the middle section (indicated by the yellow arrows in FIGS. 7c4 and 8c4). For better comparison, additional FCOM images are shown in FIGS. 15 and 16. Compared to those of CHA_20 and _∞, the cracks in CHA_100 were slowly dyed with an increase in dyeing duration (FIGS. 7b2-b4 and 8b2-b4). Unless the thickness of CHA_100 is similar to those of CHA_20 and _∞, a fair evaluation of the size and number of defects is challenging. Nevertheless, it is reasonable to conjecture that the size of the defects in CHA_100 was comparable to or smaller than that of CHA_∞, whereas the number of defects or defect density of CHA_100 was higher than that of CHA_∞.

Although the FCOM images provide detailed information about the defect structure, the dyeing process required for FCOM characterizations also can reveal the degree of undesired defects. The inset in FIG. 7 shows that the initially transparent water on the permeate side of CHA_20 became colored after 12 hours and that the concentration of dye on the permeate side gradually increased over time up to 96 hours. This was interpreted as a result of the steady passage of dye molecules along the defective cracks. Thus, the size and/or number of defects in CHA_20 were significantly greater than those of the other membranes (CHA_100 and _∞).

Figure 17:
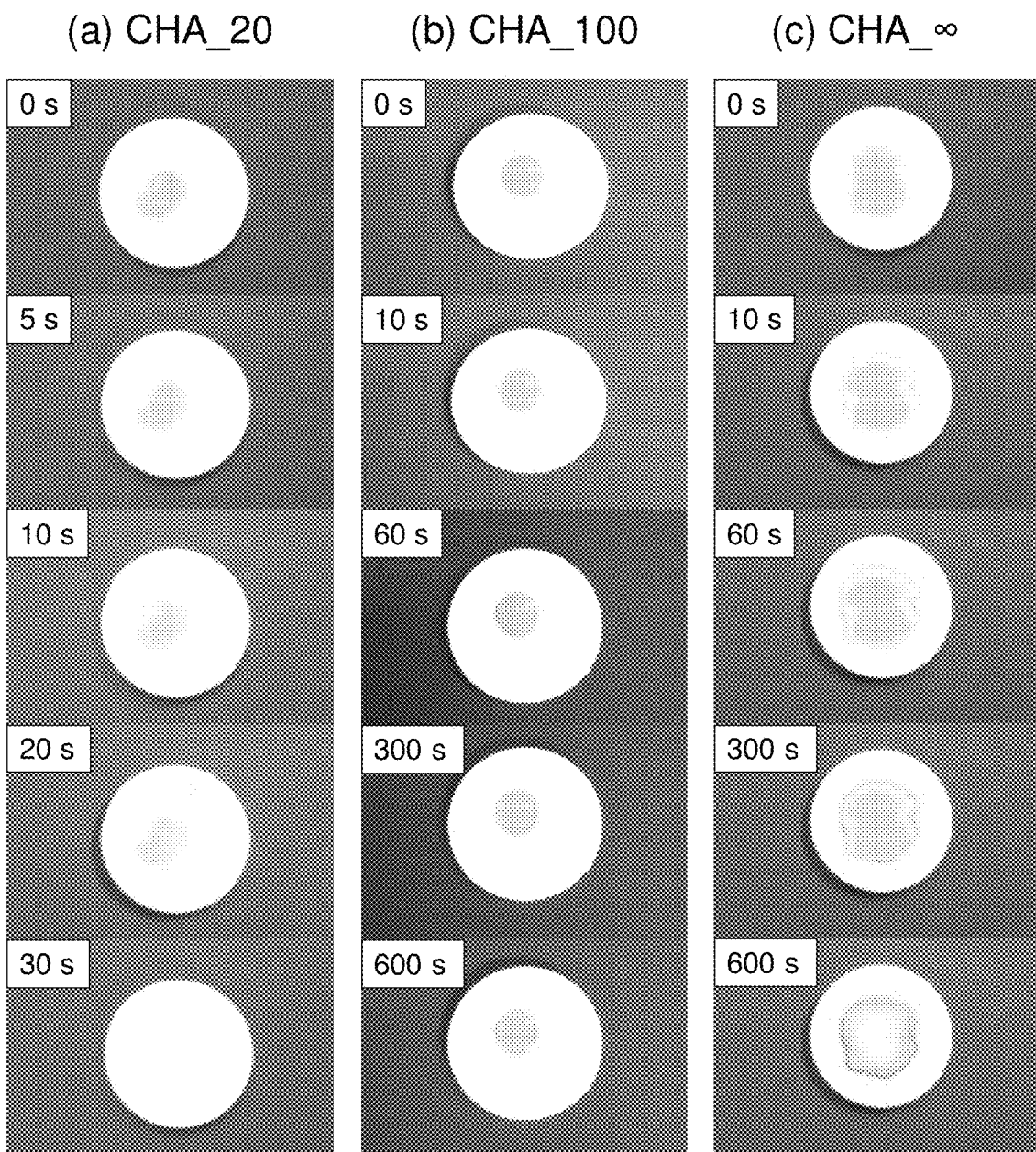
FIG. 17 is an image obtained after dropping dye on (a) CHA_20 (left), (b) CHA_100 (middle), and (c) CHA_∞ (right) membrane according to one embodiment of the present invention.

Combining the FCOM characterization (defect structure inside the CHA membranes) with the water contact angle results (hydrophilicity of the surface on the CHA membranes), a simple and rapid but reliable evaluation tool that can determine the success of a membrane fabrication was developed. Specifically, a dye solution, which was originally allowed to diffuse into the defect structure in the CHA membranes for FCOM characterization, was dropped onto the membrane surface and its diffusion into the membrane was tracked with time (FIG. 17). Technically, this tool can be considered as a time-resolved visualization of the water contact angle measurement. Considering that optical characterization is not suitable for the selective characterization of a zeolite membrane having a thickness on the order of 100 nm, simple observation of the diffusional behavior of the dropped dye molecules can provide a useful insight into the formation of undesired structures. First, this simple test (FIG. 17a) reveals that all of the dye molecules on CHA_20 penetrated the defects immediately after dropping. This result was consistent with the FCOM images (FIGS. 7 to 8) and water contact angle results (FIG. 3a). These characterizations indicate that CHA_20 was the most defective membrane. Secondly, the surface of CHA_100 was more hydrophobic than that of CHA_∞ (FIG. 17b-c), as already indicated by their respective water contact angles (CHA_100:80° vs. CHA_∞: 25° as shown in FIG. 3a). However, this test does not allow for the differentiation of differences in the defect structures, in contrast to FCOM results. In short, this simple test is thought to be proposed for the first time in the present invention and can be used as a quick screening process to aid in the exclusion of highly defective membranes.

Figure 18:
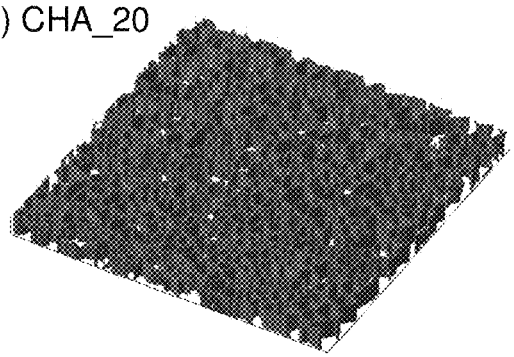
FIG. 18 is a tilted image (left) and a top image (right) obtained by performing image processing on FCOM images of (a1)-(a2) CHA_20, (b1)-(b2) CHA_100 and (c1)-(c2) CHA_∞ membrane shown in FIG. 6 according to one embodiment of the present invention.
Figure 18:
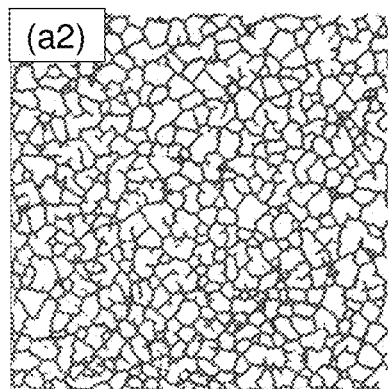
Figure 18:
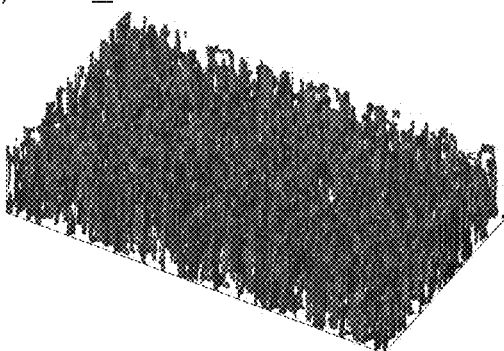
Figure 18:
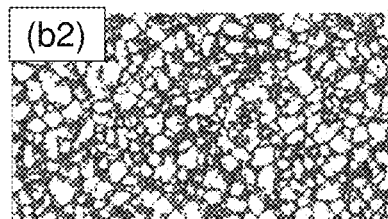
Figure 18:
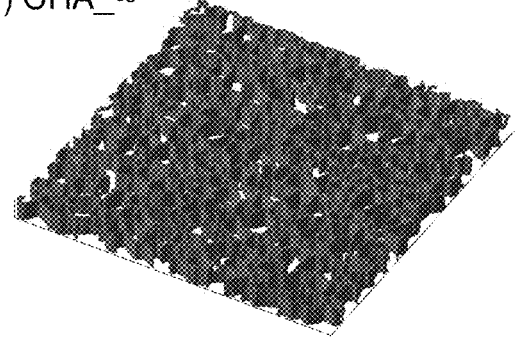
Figure 18:
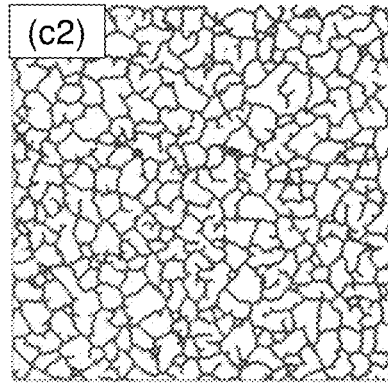

Example 5: Elucidation of $CO_2$ Separation Performance Based on Quantitative Membrane Properties To date, the qualitative analysis of defects in zeolite membranes based on the FCOM technique has mainly focused on identifying the defect density and distribution and correlating these factors with the final separation performance. However, quantitative information about the size and number of defects and association with the final membrane performance would be useful. Thus, a quantitative analysis of defects in CHA_20, _100 and _∞ was conducted based on an approach reported in a previous study by the present inventors. The resulting processed defects are schematically illustrated in FIG. 18. In the case of CHA_100, the differentiation of bright and dark spots in the FCOM image was not possible because of the presence of broad, extremely bright spots (FIG. 6b1-b3). Therefore, the image processing was performed except for the very bright spot. The quantitative properties extracted from the FCOM images were complemented with a 1-D permeation model, which was used to estimate the representative properties (tortuosity and porosity) of the defects. The relevant properties are summarized in Table 2.

Figure 9:
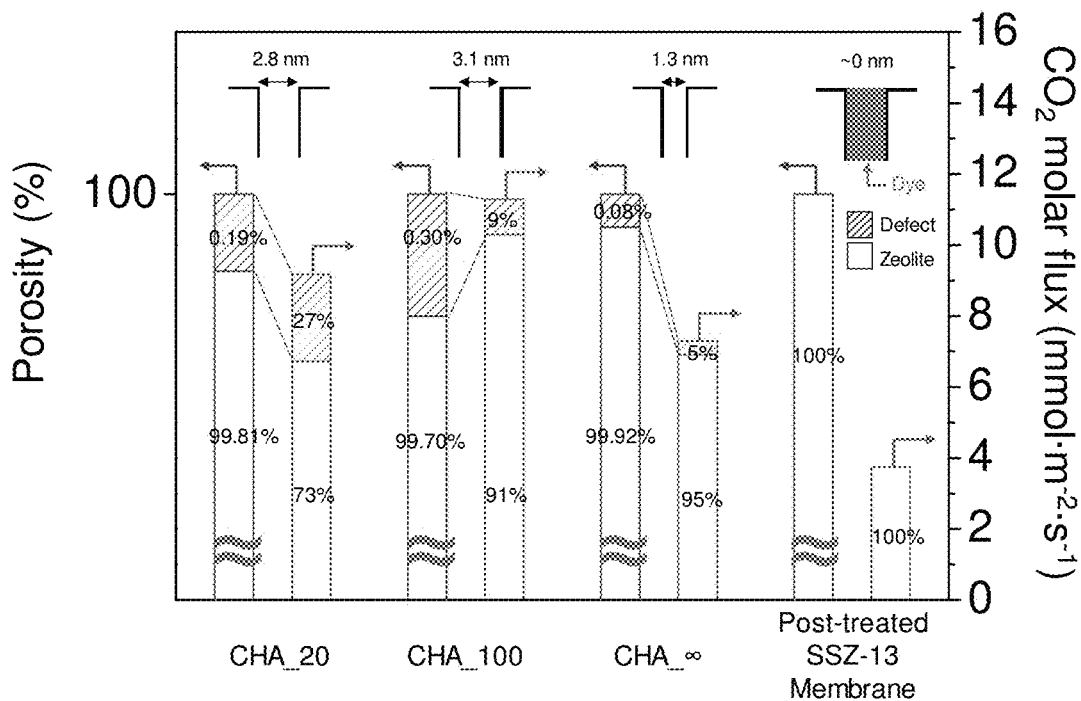
FIG. 9 shows the porosity of the non-zeolite portion (that is, defect) and the zeolite portion with corresponding effects on the total $CO_2$ molar flux regarding the CHA_20, _100,_∞, and post-treated membrane (defect-free state) according to an embodiment of the present invention.

FIG. 9 graphically summarizes the defect size and porosity and the contribution of the defects to the final molar flux of the faster permeating component (i.e., $CO_2$). Specifically, the defect sizes for CHA_20, _100 and _∞ were estimated to be 2.8, 3.1 and 1.3 nm, respectively, and the corresponding porosities were 0.19%, 0.30% and 0.08% and 0.13%, respectively. As mentioned above, it appears that the distributions of defects in CHA_20 and _∞ were comparable to each other (FIGS. 6a1-a3 and 6c1-c3), and accordingly, their pixel-based area fractions were similar (Table 2). However, a rigorous analysis based on a combination of image processing and permeation modeling reveals that the defect size (~2.8 nm) in CHA_20 was ~2 times of that (1.3 nm) in CHA_∞. In turn, this fact confirms the lower $CO_2$ permselectivity of CHA_20 under dry conditions (FIG. 2a1) than that of CHA_∞ (FIG. 2c1). Furthermore, the $CO_2$ molar fluxes passing through the defects in CHA_20 and _∞ at 30° C. under dry conditions accounted for 27% and 5% of the total $CO_2$ molar flux through the membranes, respectively (FIG. 9). Surprisingly, it was noted that despite the porosity of 0.19%, the molar flux of $CO_2$ through the defects in CHA_20 was pronounced, indicating the importance of synthetic (here, nominal Si/Al ratio) or post-treatment methods for the effective reduction of defects in CHA membranes. Indeed, the reduction in porosity from 0.19% to 0.08% could decrease the molar flux through the defects from 27% to 5% (FIG. 9). This is consistent with the previous conclusion showing that a very low number of defects (less than 1%) significantly degrade the zeolite membrane performance. In fact, the difference in the defect sizes (2.8 nm for CHA_20 vs. 1.3 nm for CHA_∞) was key to the substantial change in their $CO_2$ permselectivities (FIG. 2a1-2c1).

TABLE 2

| Sample | Tortuosity | | | Area fraction[a] | Porosity (%)[b] | Ref. |
| | x-direction | y-direction | z-direction | | | |
|---|---|---|---|---|---|---|
| SSZ-13 Membrane | 2.17 | 2.23 | 1.10 | $6.85 \times 10^{-2}$ | 0.27 | 1 |
| CHA_20 | 3.02 | 3.10 | 1.35 | $5.36 \times 10^{-2}$ | 0.24 | Present invention |
| CHA_100 | 2.55 | 2.56 | 1.58 | $8.17 \times 10^{-2}$ | 0.30 | Present invention |
| CHA_∞ | 3.81 | 3.69 | 1.24 | $4.86 \times 10^{-2}$ | 0.13 | Present invention |

As already inferred from the $CO_2$ separation performance in FIG. 2b1-c1, the more defective CHA_100 had a lower maximum $CO_2/N_2$ SF (5.2) under dry conditions (for convenience, referred to as dry maximum $CO_2/N_2$ SF) than that of CHA_∞ (7.3). Thus, the visualized defect structure along with the hydrophobicity (as indicated by the water droplet contact angle (FIG. 14b-c) and EDX results (FIG. 1b2-c2)) could account for the permeation behavior (FIG. 2b2-c2) of both membranes under wet conditions. The reduction in $CO_2$ permeance under wet conditions through CHA_∞ (less hydrophobic) seemingly resulted from the combined adsorption of water vapor in the defects and on the membrane surface. This preserved the high molecular sieving ability for $CO_2$ (FIG. 2c2). In contrast, CHA_100, which was more hydrophobic and had a larger number of defects, provided high $CO_2$ permeance because of the high hydrophobicity thereof. Although some water vapor was adsorbed on the defects, the $CO_2$ molecules could pass through the preferentially out-of-plane oriented CHA zeolite channels.

Compared to that under dry conditions, the membrane separation performance under wet conditions is a strongly couple function of the zeolite structure, surface hydrophobicity/hydrophilicity, and size/number of defects. Thus, summarized all possible membrane properties relevant to the permeation behavior of CHA_100 and _∞ and their $CO_2/N_2$ permeation results at 30° C. are summarized in Table 3, in which those of another SSZ-13 membrane (for convenience, referred to as SSZ-13 in this section) are also given for comparison. First, the effects of defects (defect (crack) porosity and defect size) on the $CO_2/N_2$ SFs of CHA_∞ and SSZ-13 were considered. The porosity difference between the two membranes (0.08% for CHA_∞ and 0.15% for SSZ-13 in Table 2) had a significant effect on their respective dry maximum $CO_2/N_2$ SFs of 7.3 and 4.6. This observation is consistent with the relationship between the porosity and dry maximum $CO_2/N_2$ SF for CHA_20 and _∞. More specifically, given the similar area fraction of CHA_20 and _∞ (Table 3), the crack size was critical in determining the final separation performance. Thus, the crack size of CHA_100, which could not be determined from its FCOM images, will be less than ~3.1 nm to achieve the dry maximum $CO_2/N_2$ SF of 5.2, because the corresponding crack density was higher than that of CHA_∞ and SSZ-13.

TABLE 3

| Membrane sample | Thickness ($\mu m$) | Water contact angle (°) | Defect size (nm) | Defect density | Dry $CO_2$ permeance × $10^7$ (mol·m$^{-2}$·s$^{-1}$·Pa$^{-1}$) | Dry $CO_2$/$N_2$ SF | Wet $CO_2$ permeance × $10^7$ (mol·m$^{-2}$·s$^{-1}$·Pa$^{-1}$) | Wet $CO_2$/$N_2$ SF | Wet/Dry $CO_2$ permeance (%) | 100-Wet/Dry $CO_2$ permeance (%) | Wet/Dry $CO_2$/$N_2$ SF | Ref. |
|---|---|---|---|---|---|---|---|---|---|---|---|---|
| SSZ-13 | ~3.5 | 78 | 1.8 | Middle | 1.4 | 4.6 | 0.37 | 10 | 26 | 74 | 2.2 | Hong S. et al.1) |
| CHA_100 | ~9.3 | 80 | 3.1 | Relatively High | 2.3 | 5.2 | 1.4 | 13.4 | 61 | 39 | 2.6 | Preparation Example 1 |
| CHA_∞ | ~2.3 | 25 | 1.3 | Middle | 1.5 | 7.3 | 0.37 | 9.7 | 25 | 75 | 1.3 | Preparation Example 1 |

1) Hong, S. et al., Healing of Microdefects in SSZ-13 Membranes via Filling with Dye Molecules and Its Effect on Dry and Wet $CO_2$ Separations. *Chem. Mater.* 2018, 30, 3346-3358.

For a fair comparison, the permeation behavior caused by the change from dry to wet conditions was focused. Specifically, the $CO_2$ permeance (wet $CO_2$ permeance) and $CO_2$/$N_2$ SF 30° C. (wet $CO_2$/$N_2$ SF) under wet conditions were compared with those (dry $CO_2$ permeance and dry $CO_2$/$N_2$ SF) under dry conditions (Table 3); the respective ratios are referred to as wet/dry $CO_2$ permeance and wet/dry $CO_2$/$N_2$ SF, respectively.

For CHA_∞, it may be reasonably speculated that water vapor was adsorbed in the defects and further adsorbed on the membrane surface of the less hydrophobic CHA_∞. Assuming that all of the defects were occupied and blocked by water vapor, for CHA_∞, the reduction in $CO_2$ permeation (i.e., wet/dry $CO_2$ permeance) was caused by defect blocking (~5%; FIG. 9) and surface inhibition (—70%). In a similar manner, for SSZ-13, the contributions to the reduction in $CO_2$ permeance arising from defect blocking and surface inhibition were ~11% and ~64%, respectively. In addition, the degrees of reduction due to defect blocking and surface inhibition for CHA_100 were estimated to be 9% and 30%, respectively. It was noted that the less degree of surface inhibition due to the physisorbed water molecules was observed for hydrophobic SSZ-13 (~64%) and CHA_100 (~30%) against less hydrophobic CHA_∞ (~70%). The relative portions of $CO_2$ permeances due to defect blocking and surface inhibition along with those of wet $CO_2$ permeances are displayed in FIG. 10.

Subsequently, the values of the wet/dry $CO_2$/$N_2$ SF for SSZ-13, CHA_100, and CHA_∞ are 2.2, 2.6, and 1.3, respectively. It appears that the water-blocking defects in SSZ-13 and CHA_100 contributed to increasing their molecular sieving abilities, as indicated by the higher wet/dry $CO_2$/$N_2$ SFs of 2.2 and 2.6, respectively. However, CHA_∞, which had the lowest degree of defects as indicated by the highest dry maximum $CO_2$/$N_2$ SF of 7.3, was unlikely to gain a marked benefit from the blocking of defects with water molecules, because the defect effects were much less significant than those of the other two membranes. Instead, a significant loss in $CO_2$ permeance without any improvement of $CO_2$/$N_2$ SFs occurred for less hydrophobic CHA_∞ by surface inhibition (up to ~56%) because of the physisorbed water molecules.

Figure 10:
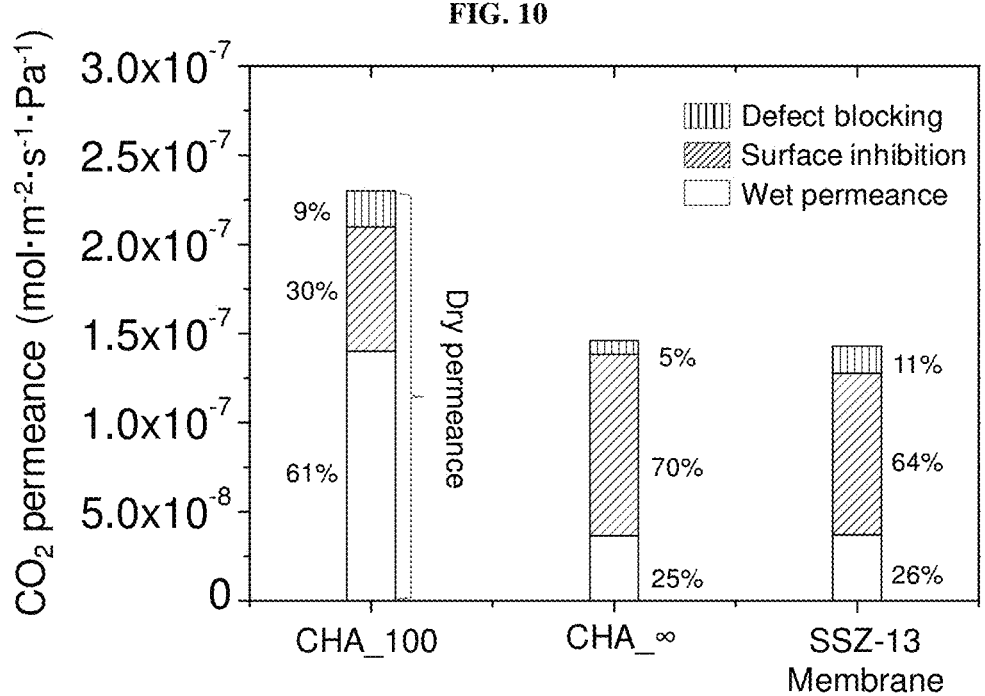
FIG. 10 is a graph showing estimated $CO_2$ permeance based on the results of defect blocking (vertical pattern) and surface inhibition (diagonal pattern) according to one embodiment of the present invention.

The absolute values of the $CO_2$ permeances obtained through the zeolitic and non-zeolitic parts were investigated (FIG. 10). First, the relative portion of molecular transport through the cracks in CHA_100 (~9%) was comparable to that in CHA_∞ (~5%). However, the corresponding $CO_2$ permeance (~2.0×10$^{-8}$ mol·m$^{-2}$·s$^{-1}$·Pa$^{-1}$) was almost 2.6 times of that (~7.7×10$^{-8}$ mol·m$^{-2}$·s$^{-1}$·Pa$^{-1}$) in CHA_∞ (FIG. 10). Then, the water-blocking of higher-density defects in CHA_100 (FIG. 6b) could effectively help to achieve higher molecular sieving in favor of $CO_2$ under wet conditions (FIG. 2b2-c2). Second, in less hydrophobic CHA_∞, the $CO_2$ permeance (~1.0×10$^{-7}$ mol·$^{-2}$·s$^{-1}$·Pa$^{-1}$) reduced by the surface inhibition was much higher than those (~7.0×10$^{-8}$ mol·m$^{-2}$·s$^{-1}$·Pa$^{-1}$) for CHA_100 and SSZ-13 (FIG. 10). Finally, the $CO_2$ permeance due solely to the zeolite parts for both CHA_100 and _∞ was estimated. For this purpose, the $CO_2$ permeance due to the defect-blocking was subtracted from the dry $CO_2$ permeance. Specifically, it was estimated to be as high as 2.1×10$^{-7}$ mol·m$^{-2}$·s$^{-1}$·Pa$^{-1}$ for CHA_100, and this value was higher than the expected value of 1.4×10$^{-7}$ mol·m$^{-2}$·s$^{-1}$·Pa$^{-1}$ in CHA_∞. This strongly indicates a beneficial role of the aforementioned preferred out-of-plane orientation in CHA_100.

Example 6: Comparison in Separation Performance Between CHA 100 and ∞

Figure 11:
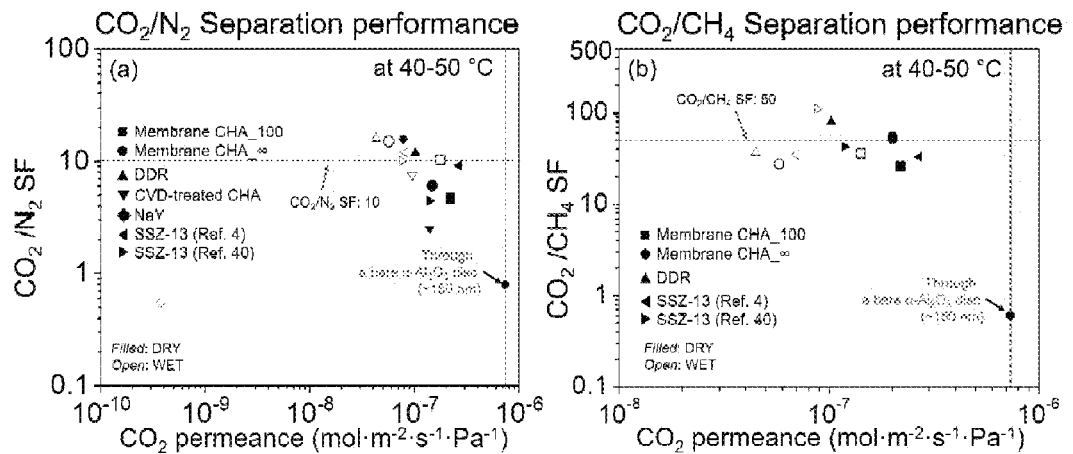
FIG. 11 is a graph showing (a) $CO_2/N_2$ SF vs. $CO_2$ permeance and (b) $CO_2/CH_4$ SF vs. $CO_2$ permeance of CHA_100 and _∞ membrane compared to those of other zeolite membranes according to an embodiment of the present invention.

FIG. 11a-b shows a summary of the $CO_2$/$N_2$ and $CO_2$/$CH_4$ separation performance of CHA_100 and _∞, as well as those of other zeolite membranes. Only the $CO_2$ separation performance measured at ~40-50° C. under dry and wet conditions is shown in FIG. 11. As already shown in FIG. 2c1-c2, the $CO_2$/$N_2$ SFs of CHA_∞ for the wet equimolar $CO_2$/$N_2$ mixture were increased compared to those under dry conditions. This trend had been also found for other hydrophobic zeolite membranes (DDR and SSZ-13). However, hydrophilic NaY membranes (Si/Al ratio of ~1.5-3) showed the opposite trend. Although these membranes showed a marked $CO_2$/$N_2$ separation performance under dry conditions, they lost this ability completely under wet conditions (water vapor pressure of ~2.6 kPa). This indicates the importance of hydrophobicity in membranes for securing high performance under wet conditions, as has been addressed and emphasized above. In addition, CHA_∞ was not significantly hydrophobic (as reflected by the lower water droplet contact angle; 25° vs. 80° for CHA_100, as shown in FIG. 14). Accordingly, the $CO_2$ permeance for CHA_∞ decreased more under wet conditions. Despite the much lowered $CO_2$ permeance in CHA_∞, some defects, where water vapor was apparently condensed, were beneficial for securing a high $CO_2$/$N_2$ SF under wet conditions. Nevertheless, the optimal defect size should be satisfied because the wider defects (here, ~3.5 nm for CHA_20, as shown in FIG. 9) negated the separation performance regardless of the presence of water vapor in the feed (FIG. 2a1-a2). The same trend as that observed for permeation for CHA_100 and _∞ in dry and wet $CO_2$/$N_2$ feeds (FIG. 11a) was also observed for $CO_2$/$CH_4$ separation (FIG. 11b), with a minor difference being the comparable $CO_2$/$CH_4$ SFs under dry and wet conditions. This trend can be explained by the good dry $CO_2/CH_4$ performance through the 8 MR zeolite membranes. Although a negative effect of non-zeolitic defects on the final performance could not be excluded completely, the defects present in CHA_100 and _∞ did not provide a non-selective pathway for the larger $CH_4$ molecules under dry conditions. Under wet conditions, water molecules physisorbed in the defects would not contribute to a significant reduction in the $CH_4$ permeance. Instead, the transport of the faster permeating species, $CO_2$, was inhibited. This reduction in the $CO_2$ permeance was still much higher for the less hydrophobic CHA_∞. Considering the fact that a more hydrophobic DDR membrane (water contact angle of 95°) showed a similar pattern to that of CHA_∞ (FIG. 11b), it appears that an appropriate combination of hydrophobicity and defect density/size is required to achieve high $CO_2/CH_4$ separation performance under wet conditions. Nevertheless, minimization of defects is always desirable for securing high performance under dry conditions. In particular, CHA_100 showed the highest molar flux of $CO_2$ in both $CO_2/N_2$ and $CO_2/CH_4$ binary mixtures, having comparable $CO_2$ permselectivities under wet conditions (FIG. 11). Specifically, the $CO_2$ permeances at 50° C. under wet conditions were as high as ~20-25% of the $CO_2$ permeance through bare supports with ~150 nm pore size. Finally, although the difference in the kinetic diameters of $CH_4$ (0.38 nm) and $N_2$ (0.364 nm) was extremely small, the resulting performance in favor of $CO_2$ molecules was quite distinct under both dry and wet conditions.

According to the present invention, a uniform CHA seed layer was prepared via the physical attachment of plate-like Si-CHA seed particles to an $\alpha$-$Al_2O_3$ disc. The limited accessibility for seed particles to reach the surface of the $\alpha$-$Al_2O_3$ disc was key to obtaining a uniform seed layer. Despite being the minor portion, the plate-like particles dominated the seed layer. The subsequent secondary growth of the seed layer with a synthetic precursor that had nominal Si/Al ratios of 100 and infinity allowed for the formation of continuous CHA membranes (denoted CHA_100 and _∞, respectively).

The synthesized CHA membranes showed modest $CO_2$ SFs (5.2 for CHA_100 and 7.3 for CHA_∞ at 30° C.) when using dry $CO_2/N_2$ binary mixtures. However, they showed improved $CO_2/N_2$ SFs as high as 13.4 for CHA_100 and 9.7 for CHA_∞ at 30° C., when using a wet feed. Such performance improvement was ascribed to the defect blocking by physisorbed water molecules and pronounced for more defective CHA_100. The trend observed for $CO_2/N_2$ separation was similar to that for $CO_2/CH_4$ separation, but the dry and wet $CO_2/CH_4$ SFs were comparable to each other. Considering the $CO_2$ molar flux (relevant to $CO_2$ recovery) and $CO_2/N_2$ SF (relevant to $CO_2$ purity) in a coupled way, CHA_100 showed a marked activity for $CO_2$ capture in the temperature range of 30-75° C. (representative of flue gas temperatures). In addition, the degree of $CO_2$ permeance reduction (75%) due to the presence of water vapor in the feed was much larger for less hydrophobic CHA_∞ (water contact angle: 25°) than that (39%) observed for CHA_100 (water contact angle: 80°), supporting that hydrophobic membrane constituents have desirable roles on membrane performance. In particular, the $CO_2$ molar fluxes through zeolitic parts and non-zeolitic parts could be effectively deciphered by complementing the information extracted from the image processing of FCOM images with a one dimensional permeation model. This indicates that increasing hydrophobicity was desirable for securing high $CO_2$ permselectivities under a realistic water vapor-containing feed condition, where defects with proper size/density could be well blocked by physically adsorbed water molecules.

INDUSTRIAL APPLICABILITY

According to the present invention, by producing a CHA zeolite membrane having a high Si/Al ratio, a CHA zeolite membrane having high $CO_2/N_2$ and $CO_2/CH_4$ separation performance even under wet conditions can be obtained.

In addition, the CHA zeolite membrane has an effect of exhibiting high separation performance even under feed conditions containing water, regardless of the temperature and pressure of the flue gas.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of preparing a CHA zeolite membrane comprising:
adding a support including a CHA particle seed layer deposited thereon into a synthetic solution for growing zeolite containing an organic structure-directing agent and a Si source, without containing an Al source; and
performing hydrothermal synthesis,
wherein the support is selected from the group consisting of polyethylene, polytetrafluoroethylene, polysulfone, ceria, and vanadia and
wherein the CHA zeolite membrane has a porosity of a defect of 0.1 to 1% and a z-axis tortuosity (tortuosity in a thickness direction of the membrane) of the defect of 1 to 2.

2. The method of preparing a CHA zeolite membrane of claim 1, wherein the organic structure-directing agent comprises one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine and cyclohexylamine.

3. The method of preparing a CHA zeolite membrane of claim 1, wherein the synthetic solution for growing zeolite has a molar ratio of $TMAdaOH:SiO_2:H_2O:NaOH$ of 1 to 100:100:1000 to 20000:1 to 100.

4. The method of preparing a CHA zeolite membrane of claim 1, wherein the hydrothermal synthesis is performed at a temperature of 100 to 200° C. for 12 to 240 hours.

5. A CHA zeolite membrane prepared by a method comprising:
adding a support including a CHA particle seed layer deposited thereon into a synthetic solution for growing zeolite containing an organic structure-directing agent and a Si source, without containing an Al source; and
performing hydrothermal synthesis,
wherein the CHA zeolite membrane has a porosity of a defect of 0.1 to 1% and a z-axis tortuosity (tortuosity in a thickness direction of the membrane) of the defect of 1 to 2.

6. The CHA zeolite membrane of claim 5, wherein the CHA zeolite membrane has a separation factor of $CO_2/N_2$ in a flue gas separation process containing water, of 10 to 30 and a separation factor of $CO_2/CH_4$ in an upgrading process of biogas containing water, of 10 to 80.

7. A method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite membrane of claim 5.

8. A method of preparing a CHA zeolite membrane comprising:
adding a support including a CHA particle seed layer deposited thereon into a synthetic solution for growing zeolite containing an organic structure-directing agent and a Si source, without containing an Al source; and performing hydrothermal synthesis,
wherein the organic structure-directing agent comprises one or more selected from the group consisting of TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine and cyclohexylamine,
wherein the CHA zeolite membrane has a separation factor of $CO_2/N_2$ in a flue gas separation process containing water, of 10 to 30 and a separation factor of $CO_2/CH_4$ in an upgrading process of biogas containing water, of 10 to 80, and
wherein the CHA zeolite membrane has a porosity of a defect of 0.1 to 1% and a z-axis tortuosity (tortuosity in a thickness direction of the membrane) of the defect of 1 to 2.

9. The method of preparing a CHA zeolite membrane of claim 8, wherein the support is selected from the group consisting of alumina, polypropylene, polyethylene, polytetrafluoroethylene, polysulfone, polyimide, silica, glass gamma-alumina, mullite, zirconia, titania, yttria, ceria, vanadia, silicon, stainless steel and carbon.

10. The method of preparing a CHA zeolite membrane of claim 8, wherein the synthetic solution for growing zeolite has a molar ratio of $TMAdaOH:SiO_2:H_2O:NaOH$ of 1 to 100:100:1000 to 20000:1 to 100.

11. The method of preparing a CHA zeolite membrane of claim 8, wherein the hydrothermal synthesis is performed at a temperature of 100 to 200° C. for 12 to 240 hours.

12. A method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite membrane prepared by the method of claim 8.

* * * * *